US010060749B2

(12) United States Patent
Dorum

(10) Patent No.: US 10,060,749 B2
(45) Date of Patent: Aug. 28, 2018

(54) METHOD AND APPARATUS FOR CREATING A CLOTHOID ROAD GEOMETRY

(71) Applicant: HERE Global B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/625,722

(22) Filed: Feb. 19, 2015

(65) Prior Publication Data
US 2016/0245657 A1  Aug. 25, 2016

(51) Int. Cl.
G01C 21/32  (2006.01)

(52) U.S. Cl.
CPC .................... G01C 21/32 (2013.01)

(58) Field of Classification Search
None
See application file for complete search history.

(56) References Cited

U.S. PATENT DOCUMENTS

| 6,405,128 | B1 | 6/2002 | Bechtolsheim et al. |
| 6,438,494 | B1* | 8/2002 | Yamamoto ............... E01C 1/002 701/408 |
| 7,084,882 | B1 | 8/2006 | Dorum et al. |
| 7,089,162 | B2 | 8/2006 | Nagel |
| 7,152,022 | B1 | 12/2006 | Joshi |
| 7,477,988 | B2* | 1/2009 | Dorum .................... G01C 21/26 701/410 |
| 7,725,424 | B1 | 5/2010 | Ponte |
| 7,912,879 | B2 | 3/2011 | Witmer |
| 8,725,474 | B2 | 5/2014 | Dorum et al. |
| 8,762,046 | B2 | 6/2014 | Dorum et al. |
| 8,786,599 | B2* | 7/2014 | Piergiovanni ........... G06T 11/20 345/419 |
| 9,120,485 | B1* | 9/2015 | Dolgov .................. B60W 30/10 |
| 2003/0100992 | A1* | 5/2003 | Khosla .................... G01C 21/26 701/514 |
| 2003/0101036 | A1* | 5/2003 | Nagel ..................... G01C 21/32 703/13 |
| 2008/0005212 | A1 | 1/2008 | Levien |
| 2008/0065613 | A1* | 3/2008 | Bober ............... G06F 17/30259 |

(Continued)

FOREIGN PATENT DOCUMENTS

| DE | 10114412 | 11/2002 |
| EP | 2418460 A2 | 2/2012 |
| KR | 20130057893 | 6/2013 |

OTHER PUBLICATIONS

International Search Report and Written Opinion for Application No. PCT/IB2016/050913 dated May 4, 2016.

(Continued)

Primary Examiner — Rami Khatib
Assistant Examiner — Nicholas K Wiltey
(74) Attorney, Agent, or Firm — Alston & Bird LLP

(57) ABSTRACT

A method, apparatus and computer program product are provided in order to create a clothoid road geometry. In the context of a method, a link geometry representative of a portion of a road network is converted into a plurality of link splines. The method also includes converting the plurality of link splines into respective sequences of one or more clothoids based upon curvature profiles of the link splines.

17 Claims, 15 Drawing Sheets

(56) References Cited

U.S. PATENT DOCUMENTS

| | | | | |
|---|---|---|---|---|
| 2009/0208098 | A1* | 8/2009 | Yang | G06T 1/60 |
| | | | | 382/164 |
| 2010/0082248 | A1* | 4/2010 | Dorum | G01C 21/32 |
| | | | | 701/533 |
| 2013/0006473 | A1* | 1/2013 | Buerkle | B60W 30/045 |
| | | | | 701/41 |
| 2014/0149014 | A1 | 5/2014 | Grothe et al. | |
| 2016/0059848 | A1* | 3/2016 | Kim | B60W 20/40 |
| | | | | 701/22 |
| 2016/0167665 | A1* | 6/2016 | Park | B60W 30/19 |
| | | | | 477/86 |
| 2017/0211372 | A1* | 7/2017 | Samuel | E21B 47/022 |

OTHER PUBLICATIONS

McCrae, J. et al., *Sketching Piecewise Clothoid Curves*, Computers & Graphics 33 (2009) 452-461.

McCrae et al., *Sketching Piecewise Cothoid Curves*, The Eurographics Assoication (2008) 8 pages.

Scalamadre, A. et al., *The Use of Rational B-Spline Curves in Geometrical Design of Road Alignments*, 1st International Conference on Computer applications in Transportation Systems, Retrieved from the internet: <URL http://xoomer.virgilio.it/antfraca/spline.htm>. (Jun. 24-26, 1996) 10 pages.

Schindler, A. et al, *Generation of High Precision Digital Maps Using Circular Arc Splines* [retrieved Feb. 10, 2016]. Retrieved from the Internet: <URL: https://www.forwiss.uni-passau.de/extern/doc/IV_2012.pdf> 6 pages.

Walton, D. J. et al. *A controlled clothoid spline*. Computers and Graphics, Elsevier, GB, vol. 29, No. 3, Jun. 1, 2005; XP027759680; pp. 353-363.

International Search Report and Written Opinion for corresponding International Patent Application No. PCT/IB2016/050914 dated May 19, 2016, 15 pages.

Office Action for U.S. Appl. No. 14/625,754 dated Mar. 31, 2017.

Office Action for corresponding U.S. Appl. No. 14/625,754 dated Jul. 5, 2016.

* cited by examiner

METHOD AND APPARATUS FOR CREATING A CLOTHOID ROAD GEOMETRY

TECHNOLOGICAL FIELD

An example embodiment of the present invention relates generally to the representation of a road network, such as for use by a map display or advanced driver assistance systems (ADAS) and, more particularly, to a method and apparatus for creating a clothoid road geometry.

BACKGROUND

ADAS was developed to improve the comfort, efficiency, safety and overall satisfaction of driving. Examples of these advanced driver assistance systems include adaptive headlight aiming, adaptive cruise control, lane departure warning and control, curve warning, speed limit notification, hazard warning, predictive cruise control, adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic and vision-oriented sensors, such as digital video cameras and light detection and ranging (LIDAR) systems.

Some advanced driver assistance systems also use digital map data. These systems are sometimes referred to as map-enhanced ADAS. The digital map data can be used in advanced driver assistance systems to provide information about the road network, road geometry, road conditions and other items associated with the road and terrain around the vehicle. Unlike some sensors, the digital map data is not affected by environmental conditions, such as fog, rain, or snow. In addition, the digital map data can provide useful information that cannot reliably be provided by sensors, such as curvature, grade, bank, speed limits that are not indicated by signage, lane restrictions, and so on. Further, digital map data can provide a predictive capability well beyond the range of sensors or even beyond the driver's vision to determine the road ahead of the vehicle, around corners, over hills or beyond obstructions. Accordingly, the digital map data can be a useful addition for some advanced driver assistance systems.

The map-enhanced advanced driver assistance systems commonly use data from a geographic database associated with a navigation system in a vehicle. The navigation system database contains data that represents the road network in the region, such as the locations (geographic coordinates, including altitude) of roads and intersections, road names, speed limits along roads, turn restrictions at intersections, addresses or address ranges along roads, the number of lanes for each road, lane width, lane markings, functional classes of roads, the locations of medians, and so on. The navigation system database may also contain information about other geographic features, such as bodies of water, parks, administrative areas (including municipal, state, and country boundaries), and locations of points of interest, such as businesses, hospitals, police stations, and so on.

The digital map data that is utilized by map-enhanced ADAS generally represents a road network with a link geometry including a plurality of polylines. Although a polyline link geometry may be useful with respect to a map system, some ADAS may be developed that prefer the data representative of a road network to be provided in another form, such as a clothoid road geometry. In this regard, clothoids are utilized in conjunction with road design and a clothoid-based road geometry may be utilized for map displays and to support ADAS capabilities. However, many challenges exist in regards to creating a clothoid road geometry from the polyline link road geometries currently utilized by map displays and ADAS.

BRIEF SUMMARY

A method, apparatus and computer program product are provided in order to create a clothoid road geometry, such as to represent two dimensional or three dimensional road geometries. By creating a clothoid road geometry from a polyline road geometry in an efficient and accurate manner, the resulting clothoid road geometry may be utilized for a map display and to support ADAS capabilities.

In an example embodiment, a method is provided that includes converting a link geometry representative of a portion of a road network into a plurality of link splines. The method of this example embodiment also includes converting the plurality of link splines into respective sequences of one or more clothoids based upon curvature profiles of the link splines.

The method of an example embodiment converts the plurality of link splines into respective sequences of one or more clothoids by determining, for each link spline, a plurality of break-point locations along a respective link spline dependent upon a curvature profile of the link spline. As such, one or more sections of the link spline are defined based upon the break-point locations. The method of this example embodiment also converts the plurality of link splines and the respective sequences of one or more clothoids by converting one or more sections of the respective link spline to respective clothoids. In this regard, the method of an example embodiment converts one or more sections of the respective link spline to respective clothoids by determining, for a section of the respective link spline having a start break-point and an end break-point, coordinates of the link spline at the start break-point and the end break-point. The method of this example embodiment also converts one or more sections of the respective link splines to respective clothoids by determining either tangent headings or curvatures of the link spline at the start break-point and the end break-point and then determining the respective clothoid based upon the coordinates and one of the tangent headings or the curvatures of the link spline at the start break-point and the end break-point.

In regards to the conversion of the plurality of link splines and the respective sequences of one or more clothoids, the method of an example embodiment also includes determining the curvature profile defining a curvature of the respective link spline at a respective arc length and identifying one or more zero-crossings in a curvature profile so as to define curves therebetween. The method of this example embodiment also includes approximating the curvature profile of the curve with a plurality of polylines. In this example embodiment, the method also determines a plurality of break-point locations based upon vertices and zero-crossings of the plurality of polylines.

The method of an example embodiment converts the link geometry into the plurality of link splines by defining a plurality of partially overlapping link chains. Each link chain is comprised of a plurality of links. The method of this example embodiment also converts the link geometry into the plurality of link splines by converting each link chain into a respective link spline and aligning respective ends of the link splines corresponding to overlapping link chains. The method of this example embodiment also includes subdividing the link geometry that includes a plurality of links into a plurality of tiles and aligning respective ends of the link splines that meet at a boundary of a tile.

In another example embodiment, an apparatus is provided that includes at least one processor and at least one memory including computer program code with the at least one memory and the computer program codes configured to, with the processor, cause the apparatus to convert a link geometry representative of a portion of a road network into a plurality of link splines. The at least one memory and computer program code also configured to, with the processor, cause the apparatus to convert the plurality of link splines and the respective sequences of one or more clothoids based upon curvature profiles of the link splines.

The at least one memory and the computer program code are configured to, with the processor, cause the apparatus of an example embodiment to convert the plurality of link splines and the respective sequences of one or more clothoids by determining, for each link spline, a plurality of break-point locations along the respective link spline dependent upon a curvature profile of the link spline. Thus, one or more sections of the link spline are defined based upon the break-point locations. The at least one memory and the computer program code are also configured to, with the processor, cause the apparatus of this example embodiment to convert the plurality of link splines and the respective sequences of one or more clothoids by converting one or more sections of the respective link spline to respective clothoids. The at least one memory and the computer program code are configured to, with the processor, cause the apparatus of an example embodiment to convert one or more sections of the respective link spline to respective clothoids by determining, for a section of the respective link spline having a start break-point and a end break-point, coordinates of the link spline at the start break-point and the end break-point. The at least one memory and the computer program code are configured to, with the processor, cause the apparatus of this example embodiment to convert one or more sections of the respective link spline to respective clothoids by determining either tangent headings or curvatures of the link spline at the start break-point and the end break-point and determining the respective clothoid based upon the coordinates and the tangent headings or the curvatures of the link spline at the start break-point and the end break-point.

The at least one memory and the computer program code are configured to, with the processor, cause the apparatus of an example embodiment to determine the curvature profile defining a curvature of the respective link spline at a respective arc length and to identify one or more zero-crossings in the curvature profiles so as to define curves therebetween. The at least one memory and the computer program code are configured to, with the processor, cause the apparatus of this example embodiment to approximate the curvature profile of the curve with a plurality of polylines. In this regard, the at least one memory and the computer program code are configured to, with the processor, cause the apparatus of this example embodiment to determine the plurality of break-point locations based upon vertices and zero-crossings of the plurality of polylines.

The at least one memory and the computer program code are configured to, with the processor, cause the apparatus of an example embodiment to convert the link geometry and the plurality of link splines by defining a plurality of partially overlapping link chains. Each link chain is comprised of a plurality of links. The at least one memory and the computer program code are configured to, with the processor, cause the apparatus of this example embodiment to convert the link geometry into the plurality of link splines by converting each link chain into a respective link spline and aligning respective ends of the link splines corresponding to overlapping link chains. The at least one memory and the computer program code are configured to, with the processor, cause the apparatus of this example embodiment to subdivide the link geometry comprising a plurality of links into a plurality of tiles and to align respective ends of the link splines that meet at the boundary of a tile.

In a further example embodiment, a computer program product is provided that includes at least one non-transitory computer-readable storage medium having computer-executable program code portions stored therein with the computer-executable program code portions including program code instructions configured to convert a link geometry representative of a portion of the road network into a plurality of link splines. The computer-executable program code portions of this example embodiment also include program code instructions configured to convert the plurality of link splines into respective sequences of one or more clothoids based upon curvature profiles of the link splines.

In an example embodiment, the program code instructions that are configured to convert the plurality of link splines into respective sequences of one or more clothoids include program code instructions configured to determine, for each link spline, a plurality of break-point locations along the respective link spline dependent upon a curvature profile of the link spline so as to define one or more sections of the link spline based upon the break-point locations. The program code instructions of this example embodiment that are configured to convert the plurality of link splines into respective sequences of one or more clothoids also include program code instructions configured to convert one or more sections of the respective link splines to respective clothoids. In an example embodiment, the program code instructions configured to convert one or more sections of the respective link splines to respective clothoids include program code instructions configured to determine, for a section of the respective link spline having a start break-point and an end break-point, coordinates of the link spline at the start break-point and the end break-point. In this example embodiment, the program code instructions configured to convert one or more sections of the respective link spline to respective cloithoids also include program code instructions configured to determine either tangent headings or curvatures of the link spline at the start break-point and the end break-point and to determine the respective clothoids based upon the coordinates and the tangent headings or the curvatures of the link spline at the start break-point and the end break-point.

The computer-executable program code portions of an example embodiment also include program code instructions configured to determine the curvature profile defining a curvature of the respective link spline at a respective arc length and to identify one or more zero-crossings in a curvature profile so as to define curves therebetween. The computer-executable program code portions of this example embodiment also include program code instructions configured to approximate the curvature profile of the curve with a plurality of polylines. In this example embodiment, the program code instructions configured to determine the plurality of break-point locations include program code instructions configured to determine the break-point locations based upon vertices and zero-crossings of the plurality of polylines. In an example embodiment, the program code instructions configured to convert the link geometry into a plurality of link splines include program code instructions configured to define a plurality of partially overlapping link chains. Each link chain includes a plurality of links. In this example embodiment, the program code instructions configured to convert the link geometry into the plurality of link splines also include program code instructions configured to convert each link chain into a respective link spline and to align respective ends of the link splines corresponding to overlapping link chains.

In yet another example embodiment, an apparatus is provided that includes means for converting a link geometry representative of a portion of a road network into a plurality of link splines. The apparatus of this example embodiment also includes means for converting the plurality of link splines into respective sequences of one or more clothoids based upon curvature profiles of the link splines.

BRIEF DESCRIPTION OF THE DRAWINGS

Figure 1:
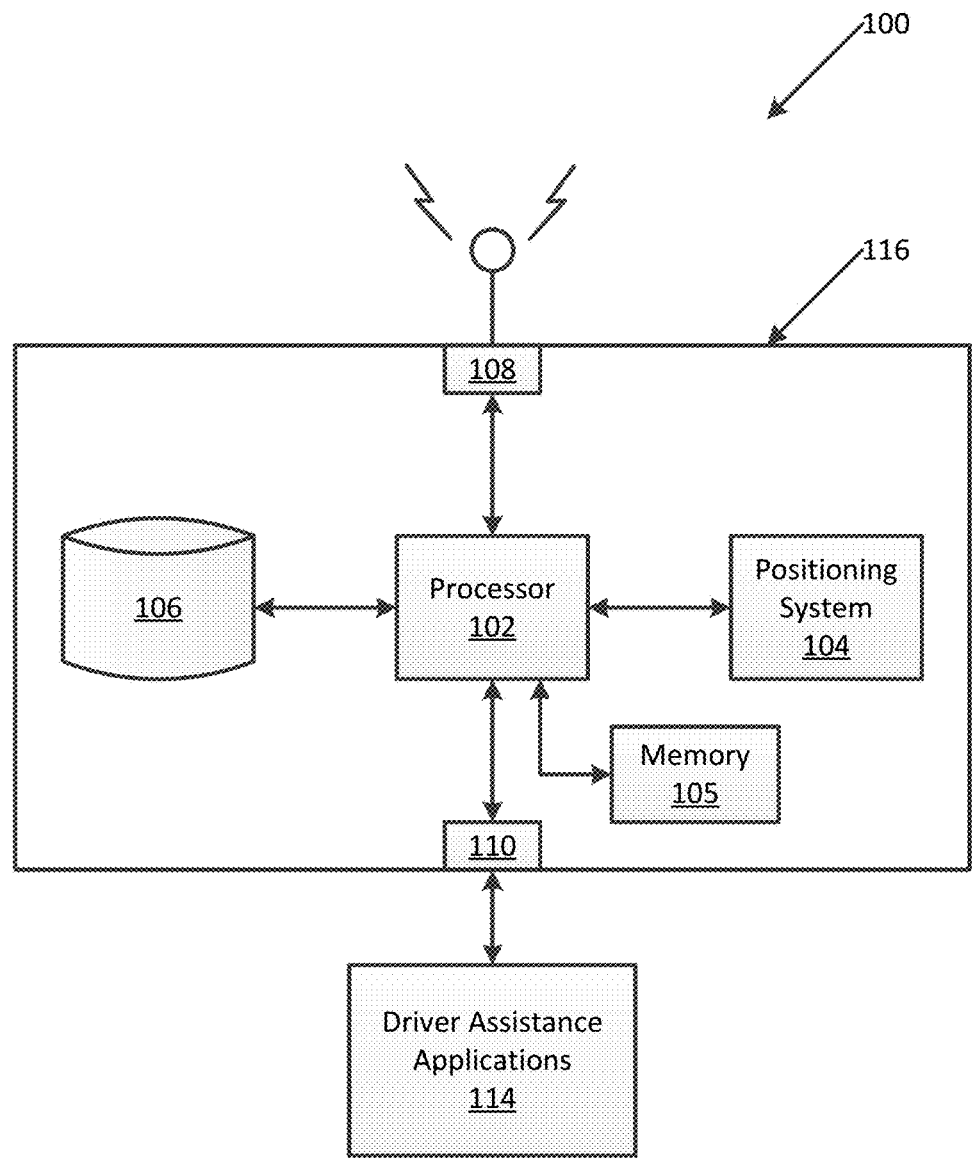
Figure 2:
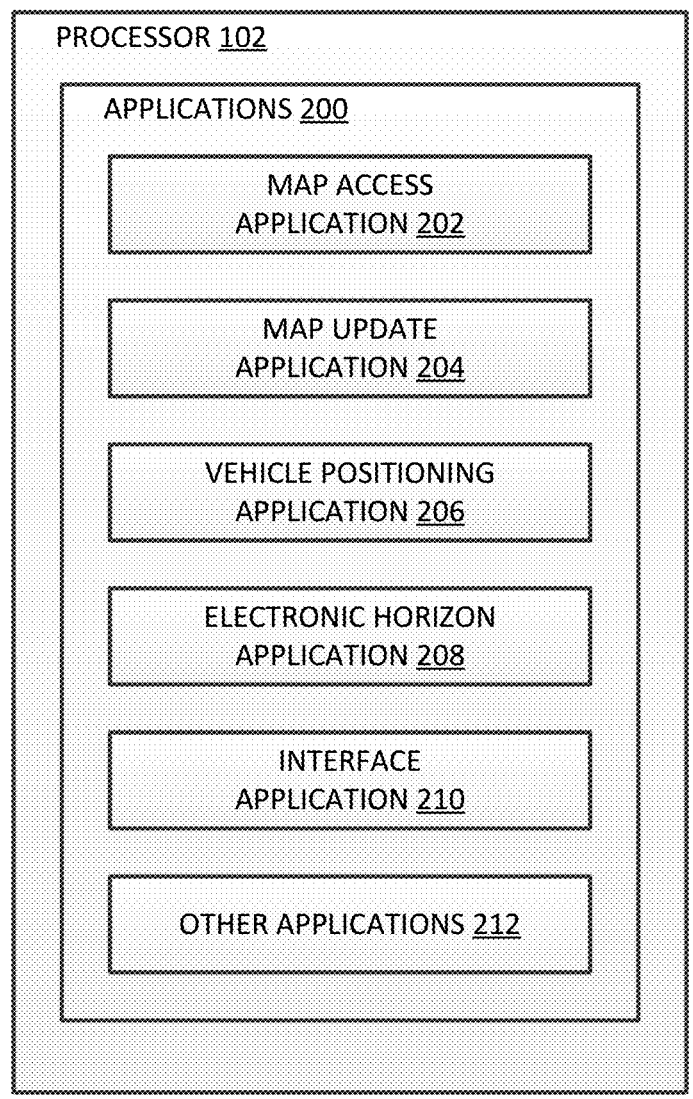
Figure 3:
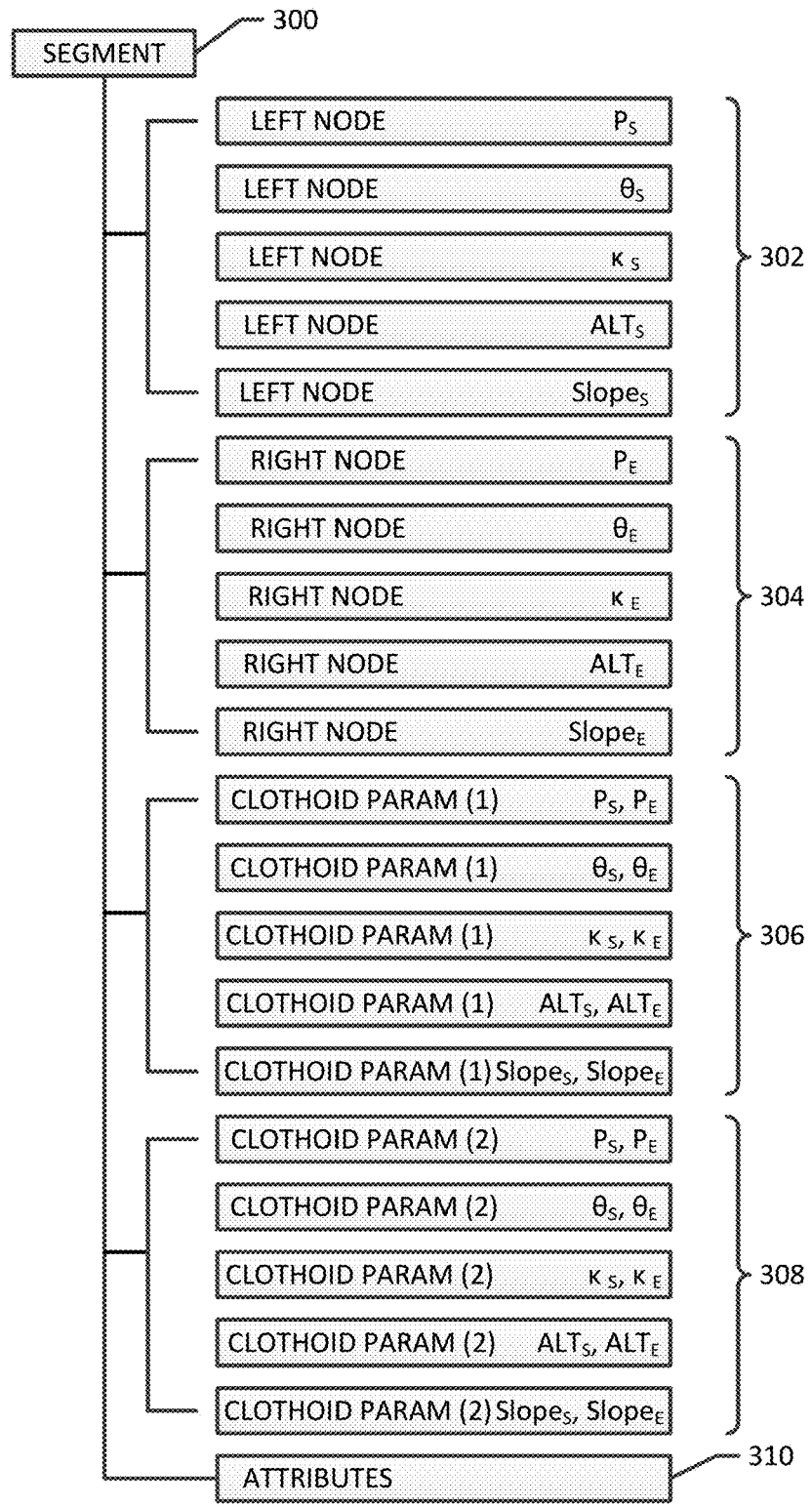
Figure 4:
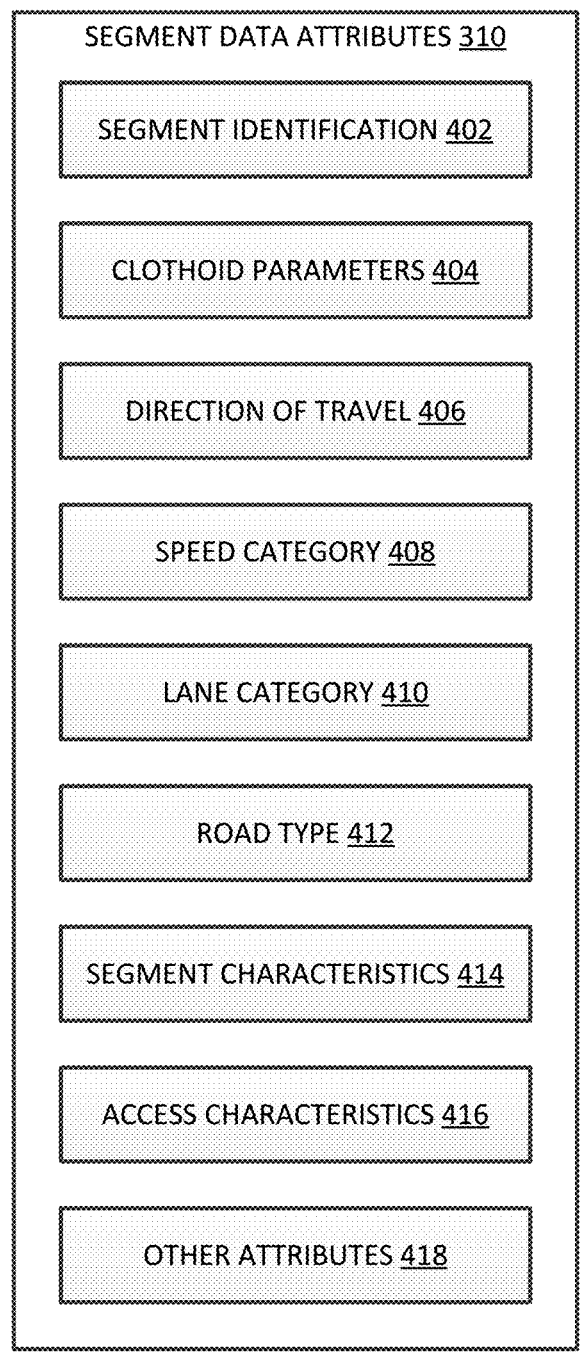
Figure 5:
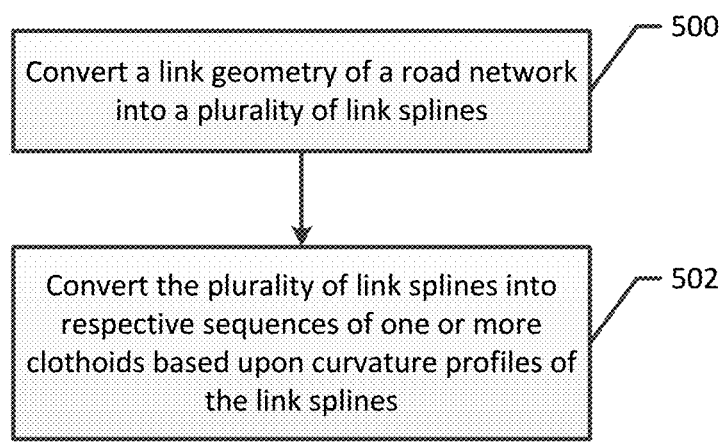
Figure 6:
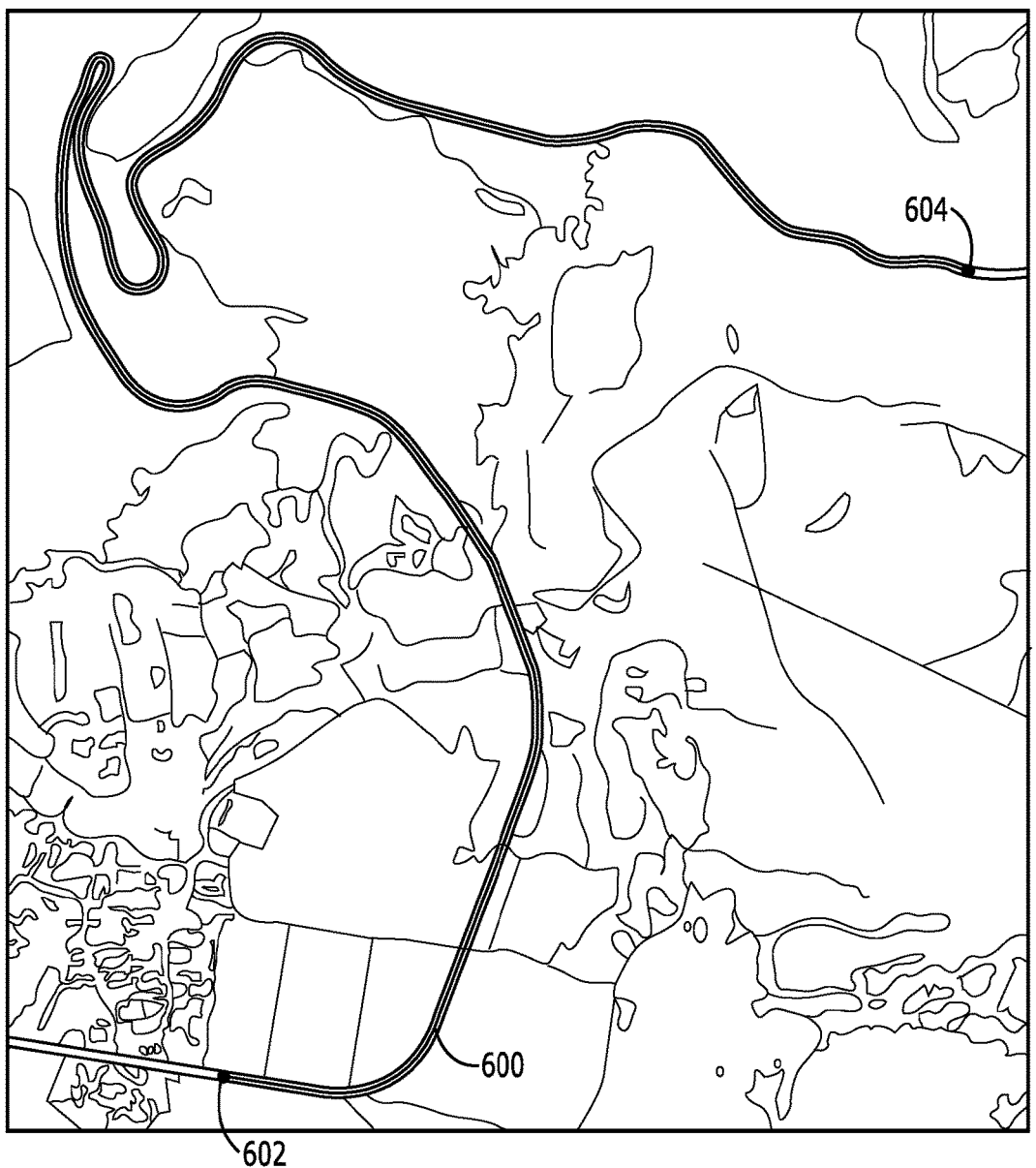
Figure 7:
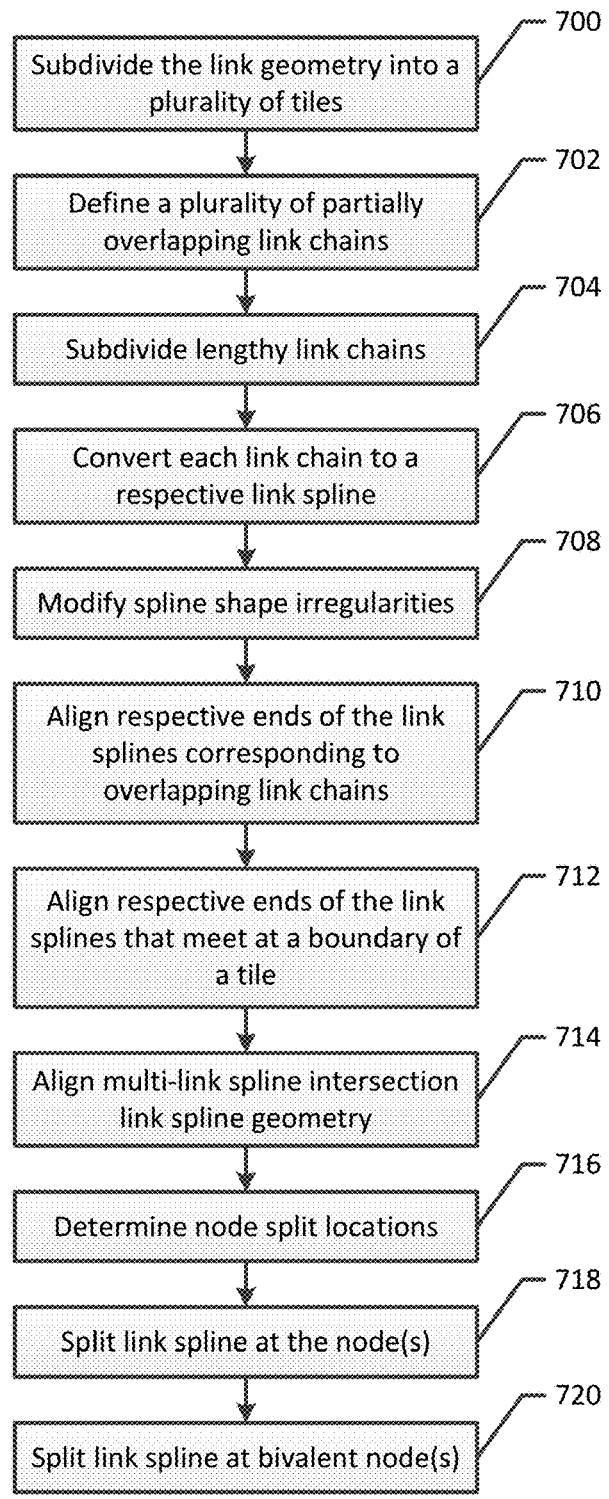
Figure 8:
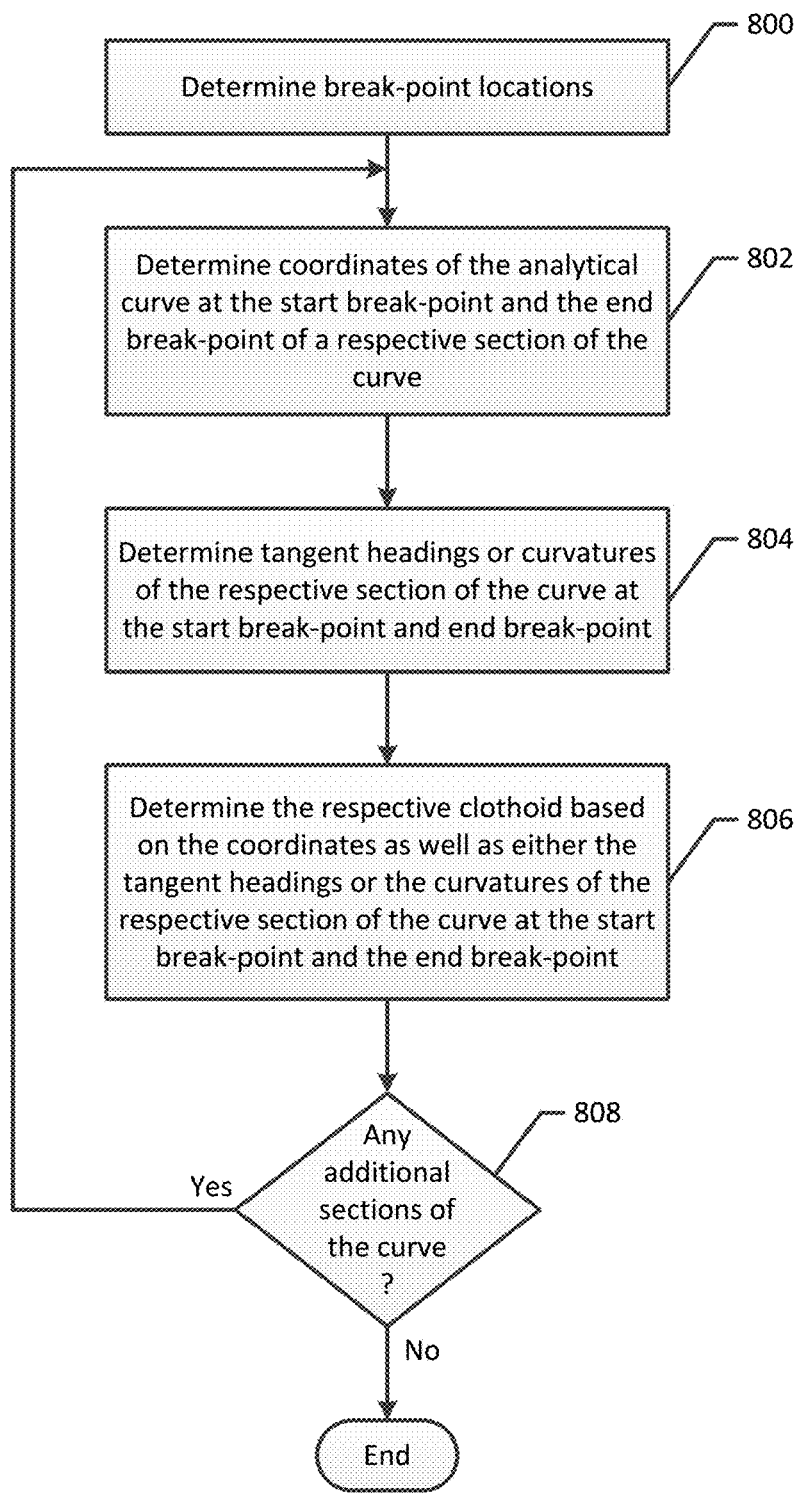
Figure 9:
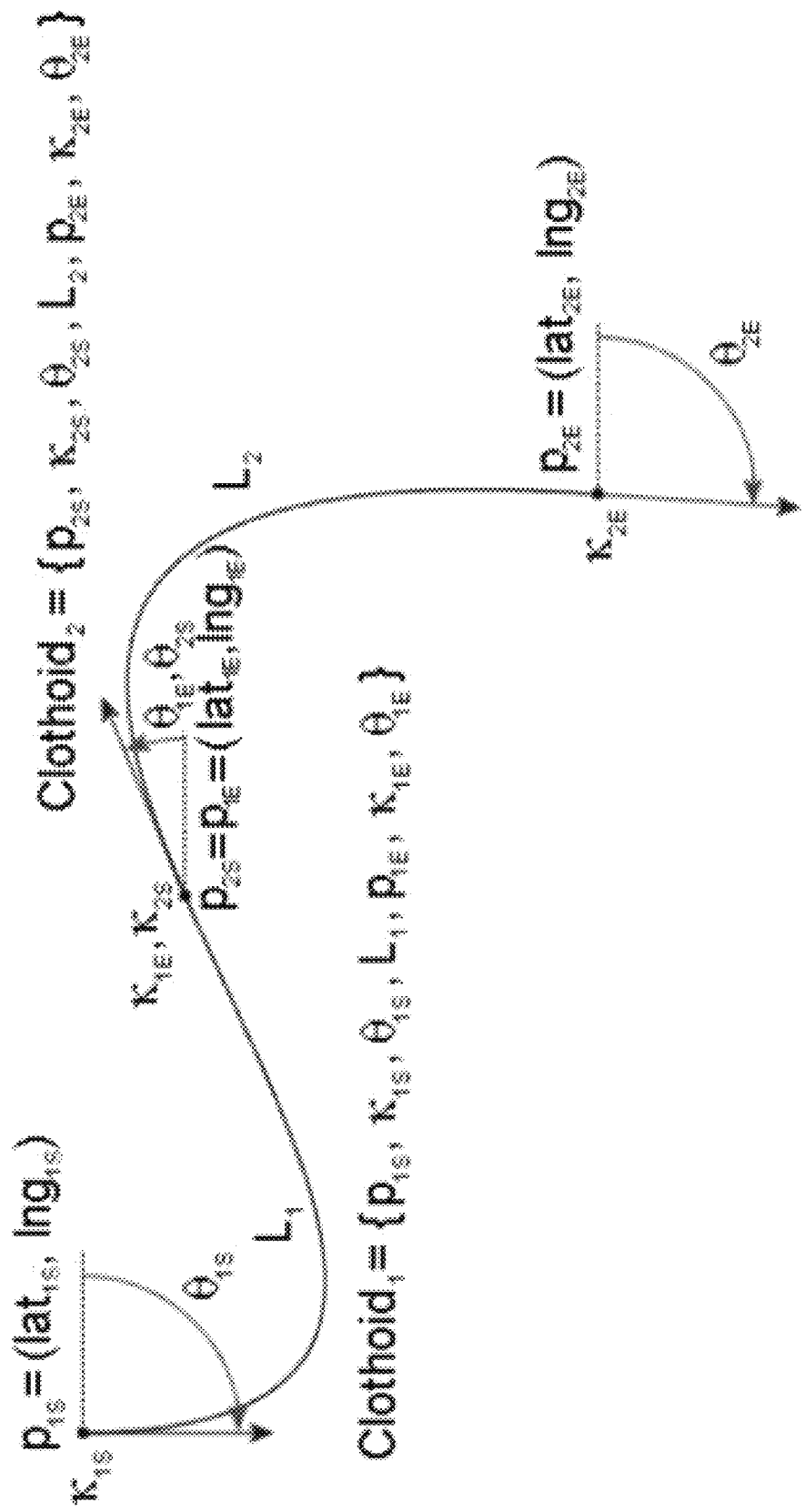
Figure 10A:
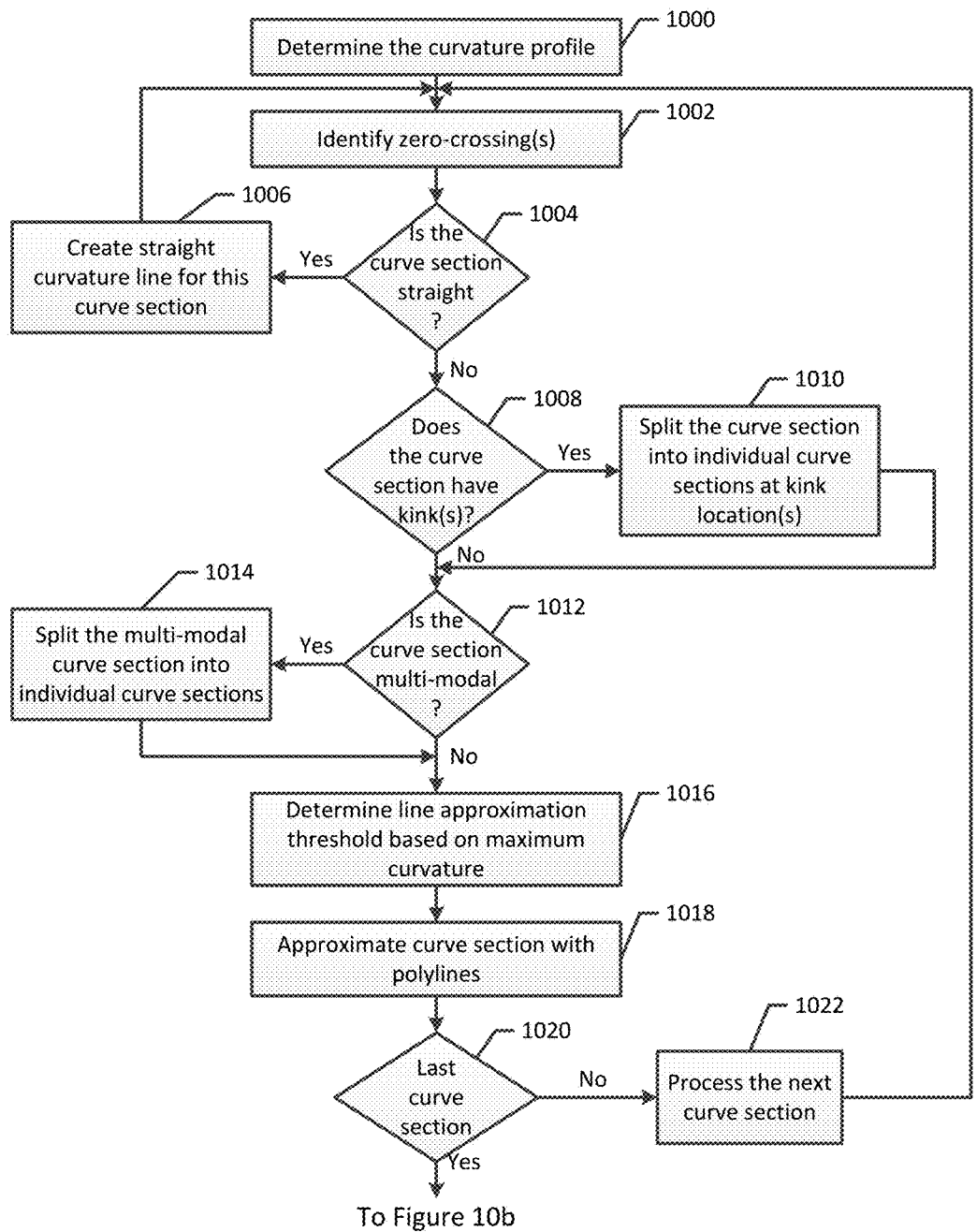
Figure 10B:
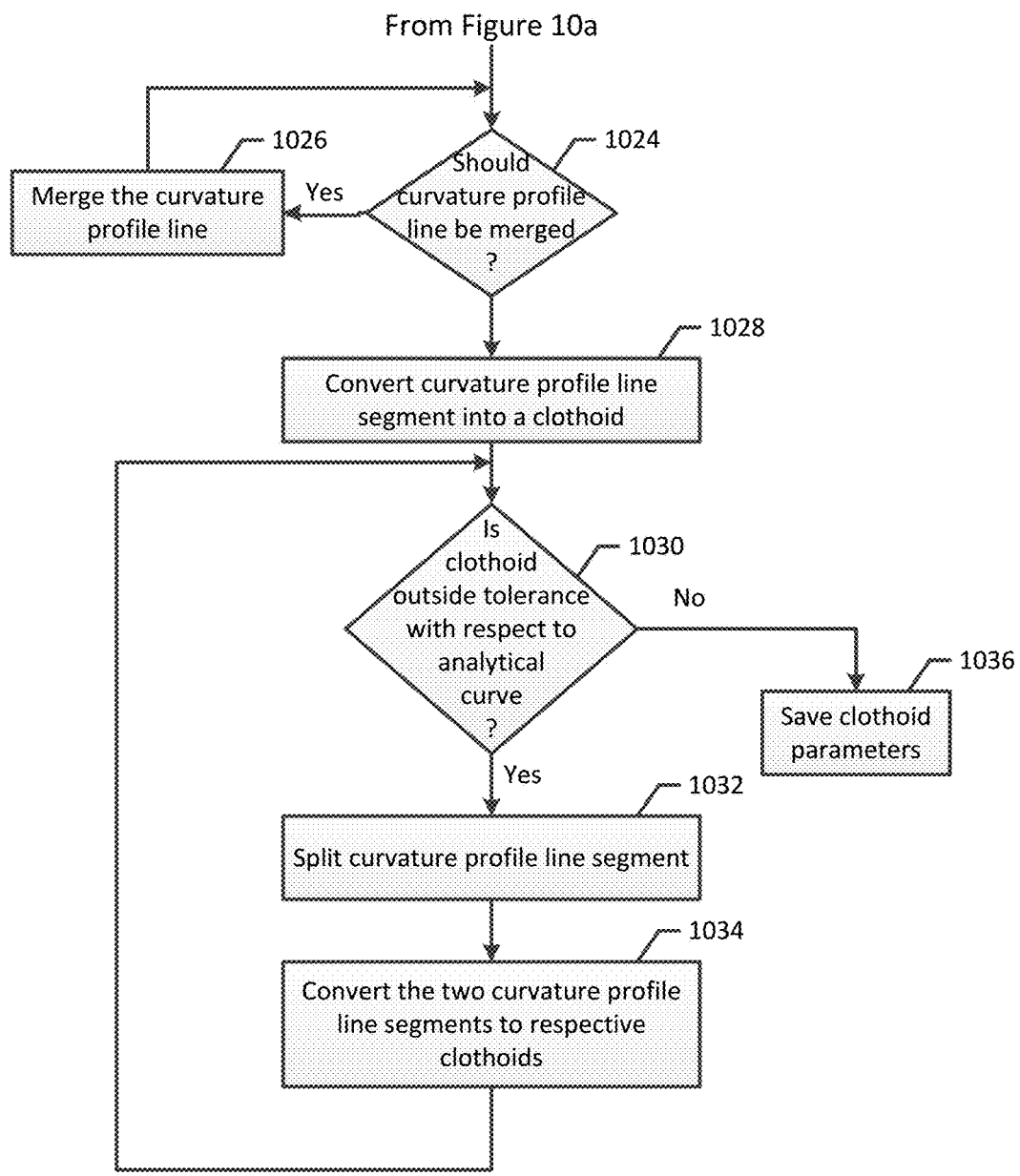
Figure 11:
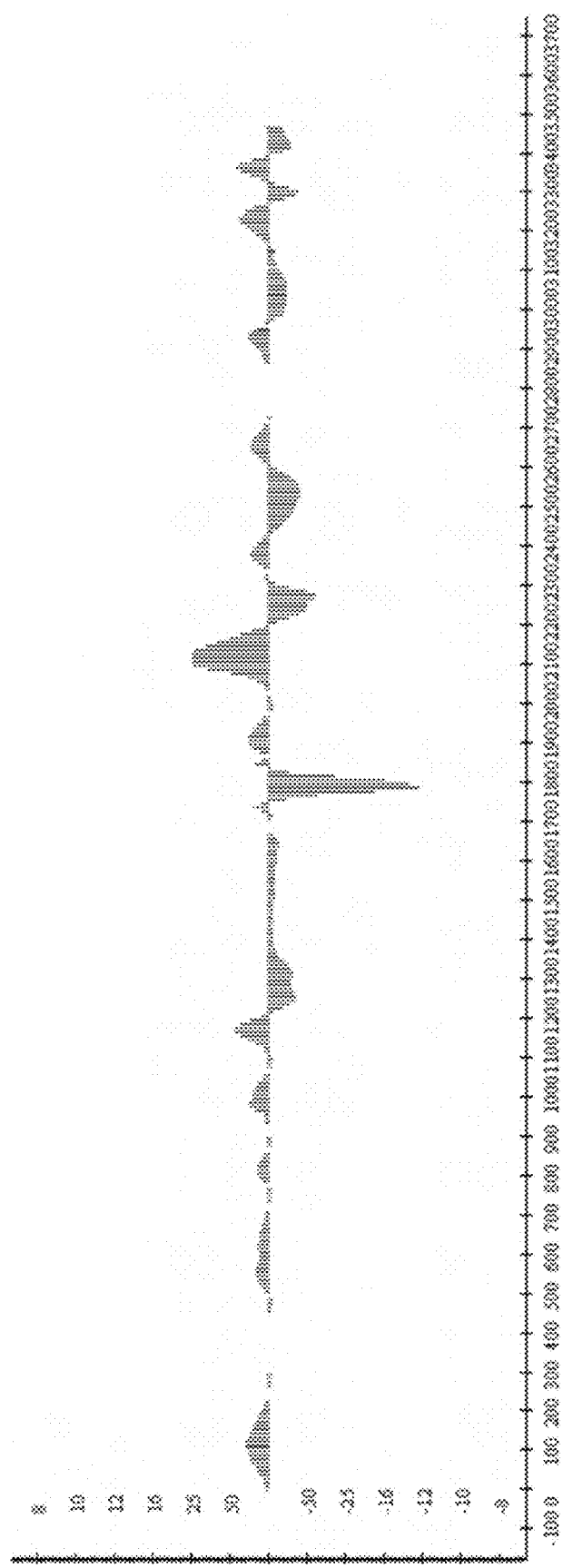
Figure 12:
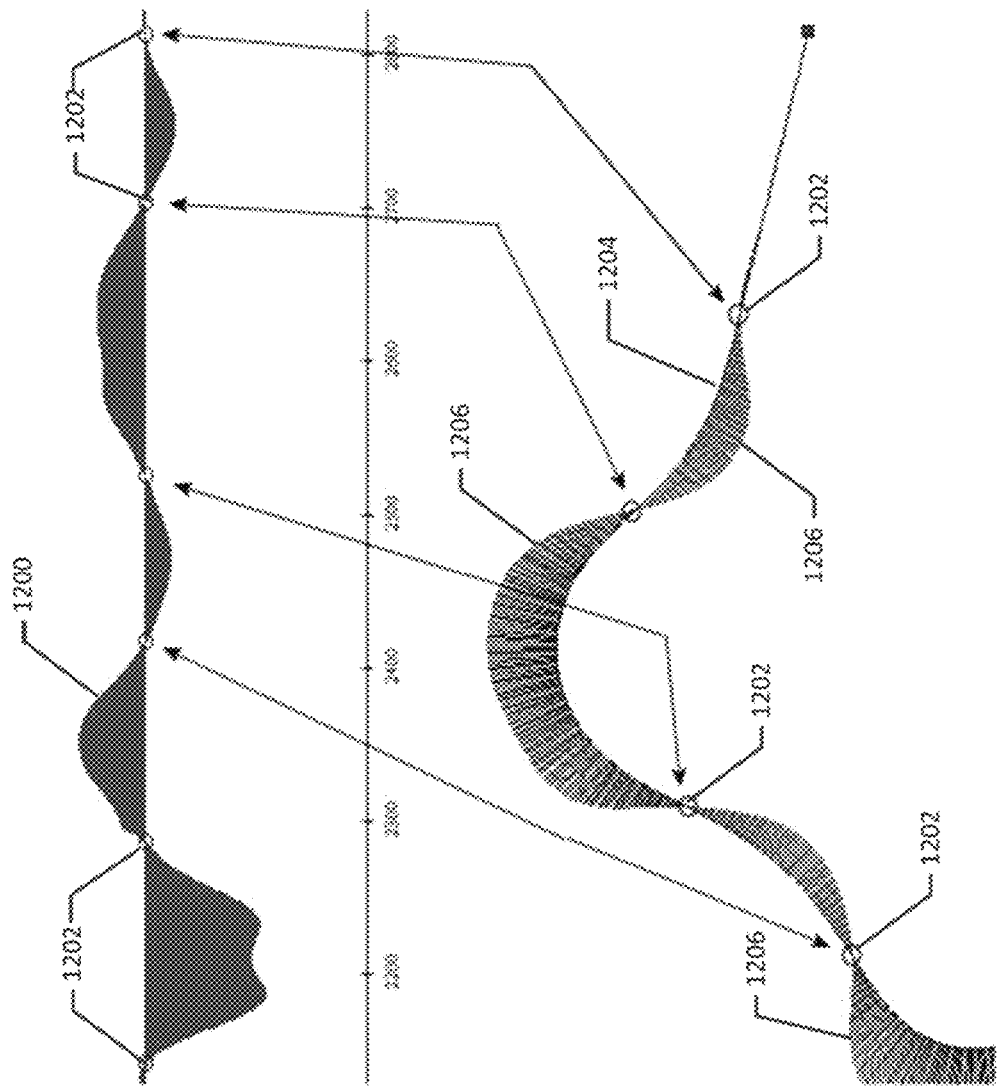
Figure 13:
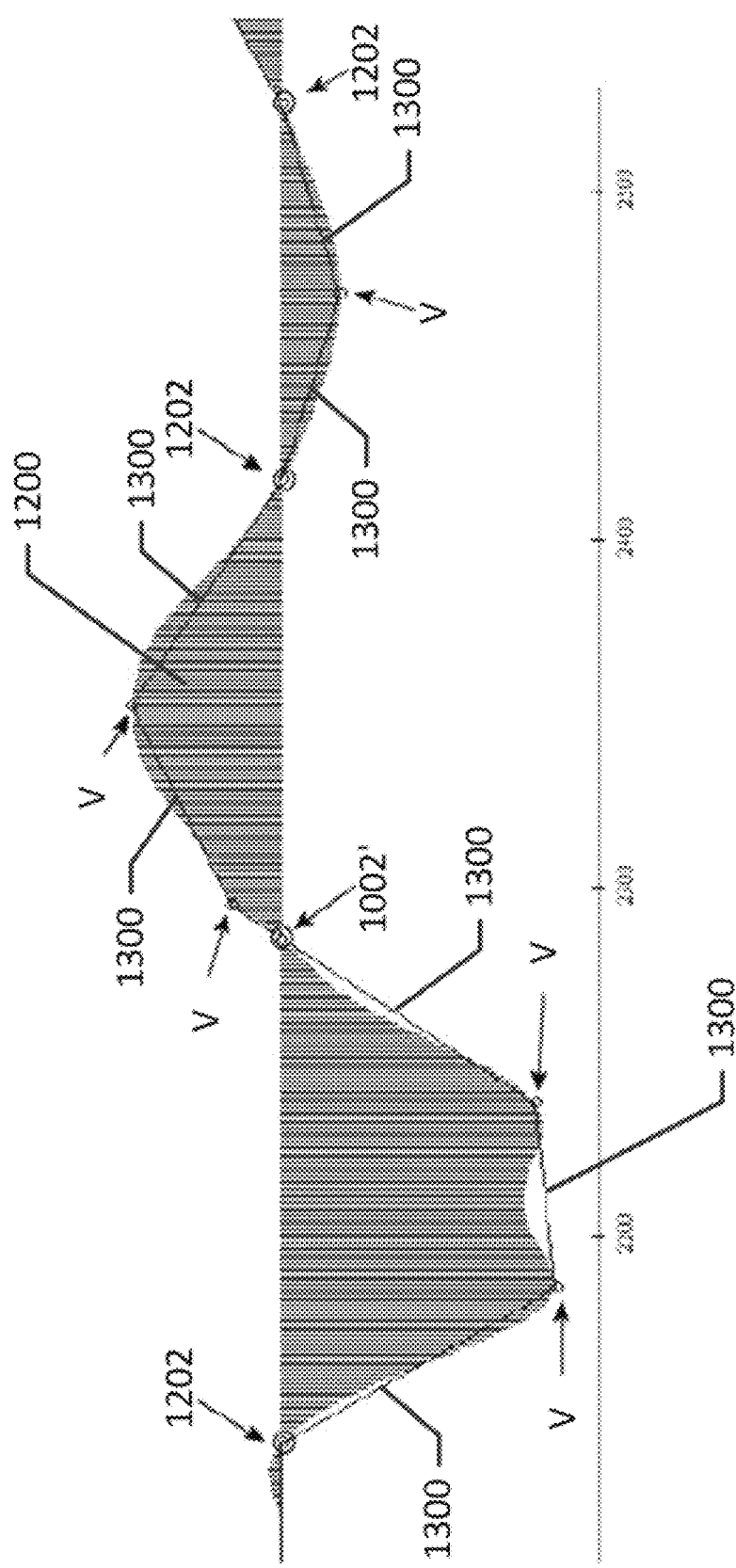
Figure 14:
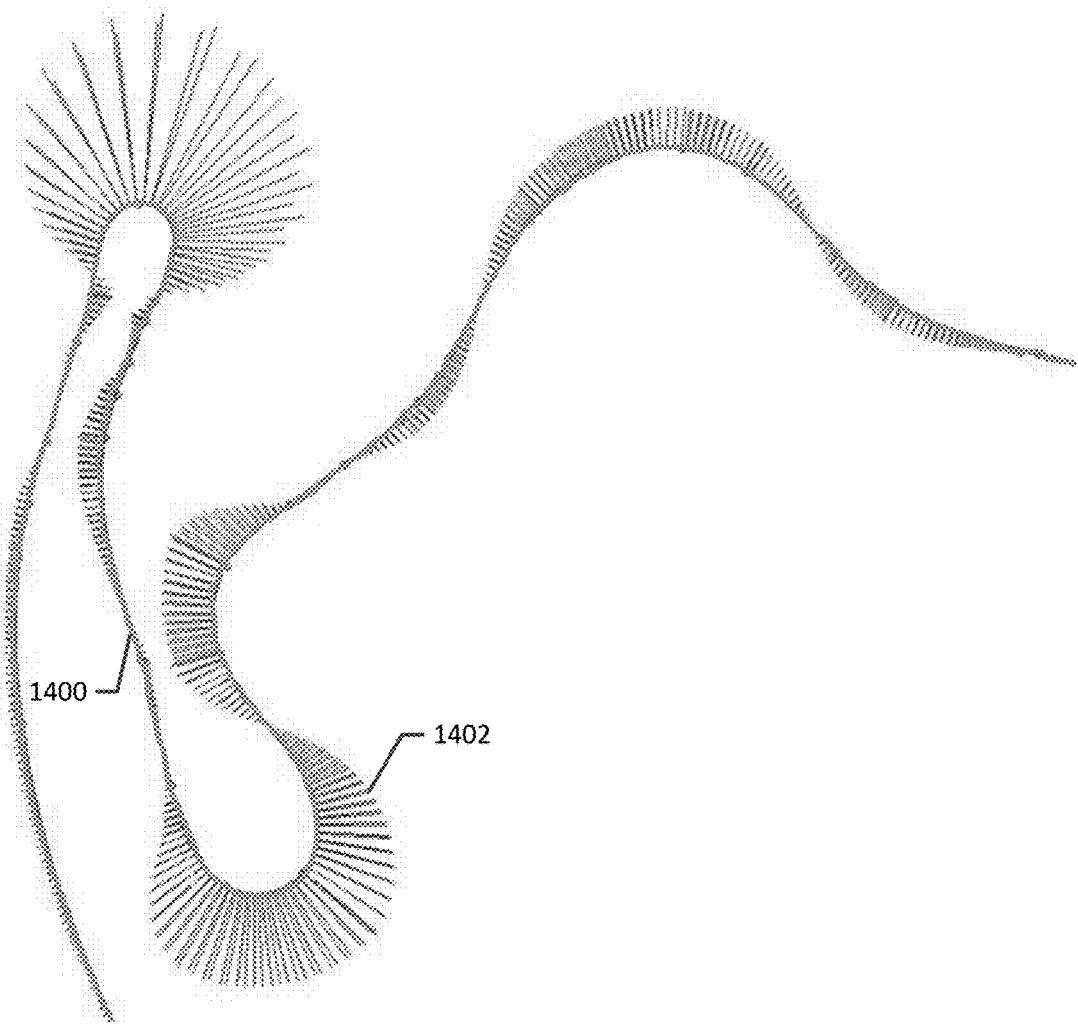

Having thus described certain example embodiments of the present invention in general terms, reference will hereinafter be made to the accompanying drawings which are not necessarily drawn to scale, and wherein:

FIG. 1 is a block diagram of an apparatus that may be specifically configured in accordance with an example embodiment of the present invention;

FIG. 2 is a block diagram illustrating a plurality of applications that a processor of the apparatus of FIG. 1 is configured to execute in accordance with an example embodiment of the present invention;

FIG. 3 is a block diagram of a road segment data record from a geographic database, such as provided by the apparatus of FIG. 1, according to an example embodiment of the present invention;

FIG. 4 is a block diagram of data attributes for the road segment data record of FIG. 3 in accordance with an example embodiment of the present invention;

FIG. 5 is a flowchart illustrating operations performed, such as by the apparatus of FIG. 1, in accordance with an example embodiment of the present invention;

FIG. 6 is a representation of an analytical curve that represents a portion of a road network;

FIG. 7 is a flowchart illustrating operations performed, such as by the apparatus of FIG. 1, in order to convert a link geometry into a plurality of link splines in accordance with an example embodiment of the present invention;

FIG. 8 is a flowchart illustrating operations performed, such as by the apparatus of FIG. 1, in order to convert a plurality of link splines into respective sequences of one or more clothoids in accordance with an example embodiment of the present invention;

FIG. 9 is a representation of an analytical curve and the clothoid curve parameters derived therefrom in accordance with an example embodiment of the present invention;

FIGS. 10a and 10b are flowcharts illustrating operations performed, such as by the apparatus of FIG. 1, in order to convert a plurality of link splines into respective sequences of one or more clothoids in accordance with an example embodiment of the present invention;

FIG. 11 is a representation of a curvature profile of the analytical curve of FIG. 6;

FIG. 12 is a graphical representation of the zero-crossings of a curvature profile as determined in accordance with an example embodiment of the present invention FIG. 13 is a graphical representation of the manner in which a curvature profile of a plurality of curve sections is approximated with polylines in accordance with an example embodiment of the present invention; and FIG. 14 is a graphical representation of the clothoid road geometry created in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to create a clothoid road geometry consisting of a sequence of clothoids. In this regard, the method, apparatus and computer program product are configured to convert a link geometry representative of a portion of a road network into a plurality of link splines and to, in turn, convert the plurality of link splines into respective sequences of clothoids. Once the road geometry is converted to a clothoid representation, the clothoid representation may be utilized for mapping, such as by a map display, and/or to support ADAS capabilities. By way of example, FIG. 1 is a block diagram of map-enhanced ADAS architecture 100. In this example, the map-enhanced ADAS architecture includes driver assistance applications 114 and an apparatus that embodies a map and positioning engine (MPE) 116. The MPE is shown in FIG. 1 as a standalone module; however, it is understood that the MPE may be distributed into multiple packages and/or integrated into other device packages, such as a sensor package. The MPE includes a processor 102, a positioning system 104, a memory 105, a geographic database 106, a communications system 108, and an in-vehicle data bus interface 110. The MPE may also include other hardware, software, and/or firmware, such as a power source.

The processor 102 receives inputs from the positioning system 104, the geographic database 106, the communication system 108, the in-vehicle data bus interface 110, and other sources. The processor then processes the inputs using application software programs 200, some of which are described with reference to FIG. 2. In some embodiments, the processor 102 (and/or co-processors or any other processing circuitry assisting or otherwise associated with the processor) may be in communication with the memory device 105 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory device 105 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The communication system 108 may be any means such as a device or circuitry embodied in either hardware or a combination of hardware and software that is configured to receive and/or transmit data from/to other electronic devices in communication with the apparatus, such as by being configured to receive data from an in-vehicle global positioning system (GPS), in-vehicle navigation system, a personal navigation device (PND), a portable navigation device or other in-vehicle data collection system. In this regard, the communication system may include, for example, an antenna (or multiple antennas) and supporting hardware and/or software for enabling communications with a wireless communication network. Additionally or alternatively, the communication system may include the circuitry for interacting with the antenna(s) to cause transmission of signals via the antenna(s) or to handle receipt of signals received via the antenna(s). In some environments, the communication system may alternatively or also support wired communication.

The processor 102 of the illustrated embodiment is configured to provide outputs to the driver assistance applications 114 via the in-vehicle data bus interface 110 and a data bus 112. In an example embodiment, the in-vehicle data bus interface and the data bus are a Controller-Area Network (CAN) interface and a CAN bus, which are designed for automotive applications. The driver assistance applications may include adaptive headlight aiming, adaptive cruise control, obstruction detection, obstruction avoidance, collision avoidance, adaptive shift control, autonomous driving and others.

The positioning system 104 may utilize GPS-type technology, a dead reckoning-type system, or combinations of these or other systems, which are known in the art. The positioning system may also include suitable sensing devices that measure the traveling distance speed, direction, orientation, and so on. For example, the positioning system may include a global positioning system (GPS) and a gyroscope. The positioning system provides an output signal to the processor 102. Some of the application software programs 200 that run on the processor use the output signal from the positioning system to determine the location, direction, orientation, etc., of the MPE 116.

The geographic database 106 is designed for ADAS applications. Like a navigation system geographic database, the geographic database contains data about roads and intersections in a geographic region. For example, the geographic database contains at least one database record (also referred to as "entity" or "entry") for each road segment (also referred to as a link). The road segment data record includes data providing clothoid parameters describing the geometric two dimensional and/or three dimensional shape of the road. The end points (also referred to as nodes) of the road segment correspond to the first and last clothoid end points. When the road segment is represented as one or more clothoids, the road segment data record includes data, such as in accordance with FIG. 9, that provides the geographic coordinates, e.g., latitude and longitude, of the clothoid end-point coordinates $P_S$, $P_E$ and the end-point tangent headings $\theta_S$, $\theta_E$ and/or the end-point coordinates $P_S$, $P_E$ and the end-point curvatures $\kappa_S$, $\kappa_E$. Although the length L of each clothoid curve is not required to define the clothoid since the length may be derived, the road segment data record may also include the length in order to potentially improve the computational performance for ADAS applications. Even though clothoids are two dimensional curves, the road segment data record may also include altitude and slope (when available) at each clothoid end point (or as a continuous function). Furthermore, since successive clothoids will share common end point coordinates and possibly identical headings, curvatures, height and slope, those properties that are common amongst adjacent clothoids need only be stored once to save memory. A road segment data record is further described with reference to FIG. 3.

As another example, when the road segment is represented as B-spline or Bezier curve(s), the road segment data record includes data providing the geographic coordinates (e.g., the latitude, longitude, and altitude) of control points. Additionally, the road segment data record may also contain a knot vector for B-spline geometry. When the road segment is represented as shape point geometry, the road segment data record includes data providing the geographic coordinates (e.g., the latitude, longitude, and altitude) of the end points of the represented road segment. For curved segments, the road segment data record also includes data providing the geographic coordinates (e.g., the latitude, longitude, and altitude) of the shape points used to characterize the polyline.

In an embodiment in which the map representation maintained by the geographic database 106 is a clothoid representation, each road segment is represented by one or more clothoids. In this example embodiment, the clothoid representation of the map may be created by a server, rather than in real-time in a vehicle. Alternatively, the map representation may be an analytical curve, such as a B-spline, that may be converted in real-time or near real-time to a clothoid representation for ADAS applications.

The geographic database 106 may include higher quality, that is, more accurate, data than the data typically contained in a navigation system geographic database. For example, with respect to road geometry, the data in the geographic database may be more accurate with respect to longitude, latitude, and/or altitude. Also, the starting and stopping locations of tunnels may be more accurately specified in the geographic database. Further, the data in the geographic database may be more accurate with respect to derived information, such as curvature.

The geographic database 106 may also include more kinds of data (e.g., more kinds of attributes) than the data typically contained in a navigation system geographic database. For example, the geographic database may include data about road objects, such as signs and crosswalks, including their positions along a road segment, sign object type, and sign text. Some of the data attributes found in the geographic database are described with reference to FIG. 4.

FIG. 2 is a block diagram depicting some of the software applications 200 available to the processor 102. The software applications depicted in FIG. 2 include a map access application 202, a map update application 204, a vehicle positioning application 206, an electronic horizon application 208, and an interface application 210. As this is not an exhaustive list of all the software applications available to the processor, FIG. 2 also depicts other applications 212, which may include a startup routine, self-test diagnostics, and so on.

The map access application 202 provides data access to the geographic database 106 stored on physical storage media. The map access application receives a request for data from the processor 102 and locates data responsive to the request on the physical storage media. The map access application preferably provides an application programming interface (API) for use by the processor and/or the applications 200.

The map update application 204 facilitates updates to the geographic database 106. The communications system 108 receives one or more parcels that either add additional coverage to an existing database or replace existing parcels. A parcel is a unit of storage for storing geographic data in the geographic database on physical storage media. For new parcels, the map update application stores the parcel on the physical storage media. For existing parcels, the map update application replaces the old parcel with the new parcel on the physical storage media.

The vehicle positioning application 206 determines the vehicle's position relative to a road network that is represented by data included in the geographic database 106. The vehicle positioning application uses the output from the positioning system 104 and matches the output to data in the geographic database using a vehicle positioning algorithm, which is sometimes referred to as a map matching algorithm.

The electronic horizon application 208 determines an electronic horizon. An electronic horizon is a collection of roads and intersections leading out from the current vehicle position to an extent determined by the electronic horizon application. The collection of roads and intersections are potential paths that the vehicle may follow from the current vehicle position. The electronic horizon application determines extent using one or more costing functions. The costing functions are based on the needs of the driver assistance applications 114 and may take into consideration various factors, such as vehicle speed, travel time, and driving distance. An example electronic horizon application is described in U.S. Pat. No. 6,405,128, which is assigned to the same assignee as the current application and is hereby incorporated by reference in its entirety.

The interface application 210 controls communications between the MPE 116 and the driver assistance applications 114 via the interface 110 and the bus 112. In an example embodiment, the interface application is based on the CAN protocol, which is a serial communication protocol for communicating between various electronic devices in the vehicle. In accordance with the CAN protocol, the various electronic devices in the vehicle can be coupled to a single serial bus (e.g., the bus 112) such that messages and data can be sent from one electronic device in the vehicle to another. The CAN protocol is a message based protocol in which CAN frames are placed on a common CAN bus. The CAN bus may be a single wire or a differentially driven pair of wires.

FIG. 3 is a block diagram of a road segment data record 300 from the geographic database 106. The road segment data record includes data used to represent a portion of the road. The data include node data 302, 304 which identify the end points of the road segment, e.g., latitude and longitude, of the clothoid end-point coordinates $P_S$, $P_E$ and the end-point tangent headings $\theta_S$, $\theta_E$ and/or the end-point coordinates $P_S$, $P_E$ and the end-point curvatures $\kappa_S$, $\kappa_E$. Although not shown in FIG. 3, the road segment data record may also optionally include the length L of each clothoid curve. Further, the road segment data record may also include altitude and/or slope (when available) at each clothoid end point. Additionally or alternatively, the altitude and/or slope may be stored as a continuous function, such as a function of using a B-spline or Bezier curve. The data also optionally includes clothoid parameter data 306, 308 which identify the same type of data parameters (at least to the extent that the data parameters are not duplicative of those stored in conjunction with other nodes) at points between the end points that can be used to represent the shape of a straight or curved segment. While the data for two clothoids are shown in FIG. 3, it is understood that a segment can contain more than one curve and the number of clothoids may depend on the number and shape of the curves in the segment. The data further include attributes 310 for the segment. Some of the attributes 310 of the segment are depicted in FIG. 4. The road segment data record may include additional data, such as shape point data and/or spline representations, e.g., B-splines or Bezier curves, as well. In this regard, spline representations may be three dimensional and may model continuous height as slope such that different curve representations may offer advantages in certain ADAS applications. For example, Bezier curves can be used to efficiently (relative to B-splines) create polylines and to compute curvature, slope and heading.

FIG. 4 is a block diagram of some of the data attributes 310 for a road segment data record 300. The data attributes depicted in FIG. 4 include segment identification (ID) 402, clothoid parameters 404, direction of travel 406, speed category 408, lane category 410, road type 412, segment characteristics 414 and access characteristics 416. As this is not an exhaustive list of all the data attributes for the road segment data records, FIG. 4 also depicts other attributes 418. For example, the segment data attributes may also include references to node data records in the form of a node ID corresponding to end points 302, 304 of the segment.

The segment ID 402 identifies a data record in the geographic database 106. The clothoid parameters 404 contain bit flags that provide additional information regarding clothoids to aid in the creation of curvature and slope profiles. For example, the clothoid parameters may include a byte-size flag per clothoid. One of the bits in the flag is assigned to curvature, while another of the bits is assigned to slope. If the curvature bit flag is set to one, then the clothoid is marked as part of the curvature profile, such as to construct a two dimensional representation of the road geometry. Similarly, if the slope bit flag is set to one, then the clothoid is marked as part of the slope profile, such as to construct a three dimensional representation of the road geometry.

The direction of travel attribute 406 represents the allowed direction of traffic flow on a segment. For example, the segment may represent a portion of a road network in which travel is permitted in both directions. Alternatively, the segment may represent a portion of a road network allowing only one-way travel. The direction of travel attribute identifies whether the segment allows bi-directional travel or unidirectional travel, and if unidirectional, the direction of travel attribute also identifies the allowed direction of travel. The speed category attribute 408 represents the general speed trend of a road based on posted or implied speed limit. The speed category attribute contains data associated with a speed range. For example, the speed category attribute may include a data representation of the integer 1 for speeds exceeding 80 mph, the integer 2 for speeds in the range of 65-80 mph, the integer 3 for speeds in the range of 55-64 mph, and so on until the speed range includes 0 mph.

The lane category attribute 410 represents the predominant number of lanes on a segment in one direction of travel. In an example embodiment, the lane category attribute does not include turn lanes. If the number of lanes is different for each direction, the lane category attribute may represent the higher number. The road type attribute 412 represents the type of road and/or functional class that the segment represents. For example, the road type attribute may contain data associated with an interstate highway, a controlled access highway, a pedestrian walkway, and so on. The segment characteristic attribute 414 contains bit flags that describe various characteristics of the segment. For example, the segment characteristic attribute may identify whether a segment is paved, a ramp, a bridge, a tunnel, a roundabout, and so on. The access characteristic attribute 416 contains bit flags that define the types of traffic allowed on the segment. For example, the access characteristic attribute may identify whether cars, buses, trucks, taxis, emergency vehicles, pedestrians, and so on are allowed on the segment.

Referring now to FIG. 5, a flowchart is depicted that illustrates operations performed in order to create a clothoid road geometry. As shown in block 500, the apparatus of an example embodiment includes means, such as the processor 102 or the like, for converting a link geometry representative of a portion of a road network into a plurality of link splines. The link geometry includes a plurality of polylines representative of respective road segments having corresponding attributes. Following conversion of the link geometry as described below, the resulting link splines are composite curves formed with piecewise polynomial functions representing curve sections and satisfying specified conditions at boundaries of the sections. Thus, there are many types of spline curves including B-splines. A B-spline has control points and knots. Knots are the points at which individual polynomial curve segments of a polynomial spline curve join together. The segments are joined in such a way as to provide smoothness of the complete curve. A knot vector is an ordered list of non-decreasing floating point numbers that describe parametric locations along the spline curve where segments begin and end.

With splines, map features, including curving road portions, are represented by polynomial equations whose coefficients have been determined so as to generate curves that match the shapes of the geographic features with the desired degree of accuracy. Thus, splines describe the shape of the underlying road geometry by specifying the coefficients of a polynomial equation. As described in U.S. Pat. No. 7,084,882, splines have been used to represent shapes of road segments in navigation system databases. U.S. Pat. No. 7,084,882 is assigned to the same assignee as the current application and is hereby incorporated by reference.

The plurality of link splines comprise an analytical curve that is representative of the same portion of the road network as the link geometry. In this regard, FIG. 6 depicts a portion of a road network as represented by an analytical curve 600 and, more particularly, by a B-spline curve, that extends from a beginning point 602 to an end point 604.

Following the conversion of the link geometry to a plurality of link splines, the apparatus of the example embodiment includes means, such as the processor 102 or the like, for converting the plurality of link splines into respective sequences of one or more clothoids based upon curvature profiles of the link splines. Further details regarding the conversion of the plurality of link splines in respective sequences of clothoid(s) are provided below.

Referring now to FIG. 7, a more detailed flowchart of the operations performed in order to convert a link geometry representative of a road network into a plurality link splines is depicted. As shown in block 700, the apparatus of an example embodiment includes means, such as the processor 102 or the like, for subdividing the link geometry that includes a plurality of links into a plurality of tiles. The link geometry may be stored by a geographic database, such as geographic database 106 or a different database that includes the data in the geographic database 106, such that the subdivision of the link geometry is accomplished by a subdivision of the geographic database. The subdivision of the link geometry into tiles facilitates parallel processing of the tiles in conjunction with the conversion of the link geometry into a plurality of link splines.

In an example embodiment, the tiles are formed in such a way that each tile contains approximately equal amount of nodes and shape points. For example, the map surface may be covered by an imaginary two-dimensional (2D) rectangular grid with fine, such as approximately 2 km by 2 km, cells. Then, the density of the nodes and shape points is computed in this example embodiment by mapping the nodes and shape points in the geographic database onto the grid. The tiles are, in turn, assembled from the grid cells. In order to ensure that each tile has approximately equal number of nodes and shape points, the whole grid of an example embodiment is recursively subdivided in half along the grid lines, both in horizontal and vertical directions, in such a way that each of the two partitions contains an equal number of geometrical points. The process continues until the tiles contain an amount of nodes and shape points that is smaller than a predefined threshold. In an example embodiment, the direction of each subdivision is selected in such a way that the aspect ratio of the tiles is minimized.

As shown in block 702, the apparatus includes means, such as the processor 102 or the like, for defining a plurality of partially overlapping link chains. Each link chain is comprised of a plurality of links. In an example embodiment, the apparatus, such as the processor 102, is configured to create link chains within each tile using data from the geographic database. The link chains are a sequence of segments, with each of the segments having the same road type attribute 412. In an example embodiment, the sequence of segments is made as long as possible. The link chains are used to perform a B-spline fit to ensure smoothness across segment boundaries.

In order to define a link chain, the apparatus, such as the processor 102, of an example embodiment selects a link to start the link chain. Each link has two nodes (also called end points). Not all nodes are at intersections. For example, some nodes are used to encode changes in road attributes. The apparatus, such as the processor, is configured to grow the link chain in both directions by including neighboring links. The apparatus, such as the processor, is also configured to determine if a node of a link added to a link chain is terminal and, if so, the link chain should stop in that direction at the terminal node. The apparatus, such as the processor, may employ one or more rules for determining if a node is terminal or not. The rules to determine if the link chain should proceed through the node, such as a nonterminal node, may include:

1. Two adjacent links in a link chain should have a common node.
2. The links in a link chain should belong to the same functional class.
3. A link should only be included in one link chain.
4. Each link should be included in a link chain.
5. A link chain that contains roundabout link, that is, links associated with a roundabout attribute 414 should not contain regular links.
6. If the angle between two links exceeds a predefined threshold, then the links should not form a link chain. This rule is not applicable to roundabout chains.
7. Node connects to at least two links.

The apparatus, such as the processor 102, may also employ other rules, such as additional or different rules, for identifying terminal nodes. If the apparatus, such as the processor, identifies a terminal node, the growth of the link chain is halted with the terminal node.

Alternatively, if a node is not identified as a terminal node, the apparatus, such as the processor 102, is configured to determine a path, such as an optimal path, through the node. At each node, the apparatus, such as the processor, identifies the possible paths through the node that could be added to the link chain and determines a path weight for each identified possible path. In an example embodiment, the path weight is determined using the lane category attribute 410, the road type attribute 412, and other attributes 418, such as the angle of the path from the node and whether a road divider is located on the road represented by the link. Additionally, the path weight is determined in a manner to limit the amount of change in a direction through an intersection.

In one example embodiment, the apparatus, such as the processor 102, is configured to determine which path to use for continuing the link chain based on the combination of two factors: the angle between the links and the difference in the number of lanes between the links. The probability of a link chain continuing onto a new link may be determined according to the following formula:

$$P = 0.7 * P_{angle} + 0.3 * P_{lane\#},$$

where $$P_{angle} = \frac{180 - angle}{180} \text{ and } P_{lane\#} = \frac{10 - |\Delta lane\#|}{10}.$$

In the foregoing formula, angle is the angle between the links in degrees and Δlane# is the difference in number of lanes between links (not to exceed 10 in an example embodiment).

At every node where more than two links intersect, the possible ways of forming a legitimate link chain are compared and ranked according to the calculated probability, and the best choice is selected. Consequently, the formation of the link chains does not depend on the order in which link chains are created.

The apparatus, such as the processor 102, of this example embodiment is also configured to determine whether to continue through the node based on the computed path weight. If a determination is made to go through the node, the path with the highest weight is chosen to be added to the link chain. If not, the growth of the link chain is halted.

With respect to road ramps, the link geometry for ramp geometry is offset to lie in the ramp road center to prevent artificial curve inflections that may occur if the spline would attach to the main highway road center. The ramp geometry is therefore disconnected to insure correct ramp road center shape and curvature for proper ADAS functionality. Further details regarding the ramp geometry is provided by U.S. Pat. Nos. 8,762,046 and 8,725,474, the contents of which are incorporated by reference in their entirety. A similar technique may be employed for single to double digitized geometry transitions, for a number of lane changes and for some complex intersection geometry situations.

As shown in block 704, the apparatus of an example embodiment includes means, such as the processor 102 or the like, for splitting lengthy link chains, such as link chains that are too long to be curve fitted in one operation. In an example embodiment, the determination is made based on the length of the chain, such as a length exceeding 25 km is considered too long, the total number of nodes and shape points, such as a total number exceeding 5000 being considered too long, and/or other factors. In an example embodiment, the link chains are split close to the middle of the polyline length and where the link chain polyline is as straight as possible.

To achieve both objectives, the apparatus, such as the processor 102, of an example embodiment starts the search in both directions, starting from the node that is located closest to the middle of the link chain. For every node considered, a window around the node is built to determine if the node is located within a relatively straight segment. A segment is determined to be straight by projecting the internal points on the segment formed by the two end points and verifying that the distances from points to the segment do not exceed a threshold and that the internal points project into the interior of the segment. The apparatus, such as the processor, continues the search in both directions until finding a node meeting the objectives. If a good node, that is, a node meeting the objectives, for the split is not identified, the straight segment criteria is relaxed and the search is again repeated.

The apparatus of an example embodiment also includes means, such as the processor 102 or the like, for converting each link chain to a respective link spline, such as by employing regularized dynamic relaxation to fit a smooth spline curve for all FC1 through FC5 link chain geometry types. See block 706 of FIG. 7. While a link chain may be converted to various types of link splines, the conversion of the link chain to a 2D B-spline is hereinafter described by way of example, but not of limitation. In this regard, the apparatus, such as the processor, is configured to fit the link chains to a 2D B-spline. More particularly, the apparatus, such as the processor, of an example embodiment is configured to fit the 2D B-spline to a single link chain including data points from the chain's neighboring link chains at both ends when possible. By including data points from neighboring link chains, successive curve fits are caused to overlap, which may ensure shape consistency at the boundary between curve fits. The apparatus, such as the processor, may include rules to determine when to use data points from neighboring link chains. A roundabout is an example of when data points from neighboring link chains are not used. The overlap of neighboring link chains may be significant, such as several kilometers.

The apparatus, such as the processor 102, of this example embodiment is configured to iteratively determine the optimal local curve stiffness based on the specified curve fit tolerance. For example, the apparatus, such as the processor, is configured to use calculus of variations to regularize the spline fit by minimizing the change of curvature along the spline. The curve fit is performed in accordance with an example embodiment by minimizing the following function:

$$\mathcal{J} = \text{Min}\left\{\sum_{i=1}^{N}(p_i - f(i))^2 + v_j(s)\int_\Omega \left|\frac{\partial k}{\partial s}\right|ds\right\}$$

wherein $v_j(s)$ expresses varying amount of regularization along the curve for iteration number [j]. $v_j(s)$ may be a continuous function as a function of arc length along the curve or implemented discretely, such as a unique value for each curve segment of the spline. The integral:

$$\int_\Omega \left|\frac{\partial k}{\partial s}\right|ds$$

expresses a change of curvature along the fitted curve. The regularization function to minimize the change of curvature can alternately be expressed as:

$$\int_\Omega \left(\frac{\partial k}{\partial s}\right)^2 ds.$$

The Least Squares term $$\sum_{i=1}^{N}(p_i - f(i))^2$$

measures the deviation between the fitted curve and the data points. Overall, the curve fitting minimization function minimizes the deviation from the data points while ensuring that the curvature changes as little as possible while staying consistent with the data points to capture the shape of the underlying road geometry. Further details regarding the conversion of each link chain to a respective link spline is provided by U.S. Pat. Nos. 8,762,046 and 8,725,474.

Kinks are common in FC5 and FC4 geometries, but may also occur at lower functional classes. The apparatus, such as the processor 102, of an example embodiment is configured to identify kinks in the link road geometry and to treat the kinks as follows. In this regard, the apparatus, such as the processor, of an example embodiment is configured to identify link kink locations and to split the link chain into individual sub-link chains at the kink locations. The apparatus, such as the processor, of this example embodiment is also configured to perform the spline fix to each sub-link chain and to join the resulting splines, such as into a single non-uniform non-rational B-spline with C0 continuity at the kink locations.

As shown in block 708 of FIG. 7, the apparatus of an example embodiment also includes means, such as the processor 102 or the like, for modifying spline shape irregularities. The B-spline shape irregularities may include bow-outs and oscillations, but can also include regions where there are other curve irregularities, such as noisy curvature. Irregularities may occur when not enough shape points are used to define the curve of a segment or the road segment has poorly placed shape points. If the B-spline is not straight where the underlying road geometry is known to be straight after adding the virtual shape points, the apparatus, such as the processor, may be configured to manipulate the control points to straighten the B-spline. A similar technique may be used to smooth noisy curvature regions.

The apparatus of an example embodiment also includes means, such as the processor 102 or the like, for aligning respective ends of the link splines corresponding to overlapping link chains, thereby aligning spline ends within a tile. See block 710 of FIG. 7. In this regard, while the spline fits are overlapping, not all of the resulting B-splines join perfectly at a node. To align two B-splines at a node, the B-spline ends are aligned so that they meet at a common point in the XY plane with smooth tangent and curvature, that is, C2 continuity. To align the B-spline ends, the apparatus, such as the processor, of an example embodiment utilizes a patch B-spline to create a smooth transition between the two B-splines. The apparatus, such as the processor, of this example embodiment projects a mid-point on the patch B-spline between the misaligned B-spline ends. In this example embodiment, the apparatus, such as the processor, is configured to split the patch B-spline and merge knot vectors to make each half of the patch B-spline compatible to the misaligned B-splines. The apparatus, such as the processor, of this example embodiment determines the parametric extent for the patch B-spline to replace the existing B-spline shape and copies the control points from the subdivided patch B-spline for the replacement region into the B-splines. In this example embodiment, the apparatus, such as the processor, is also configured to removes any unnecessary knots, e.g., due to the knot merging step to make B-splines compatible, while ensuring good B-spline quality, e.g., within error tolerances for position, heading and curvature error.

As shown in block 712, the apparatus of an example embodiment also includes means, such as the processor 102 or the like, for aligning respective ends of the link splines that meet at a boundary of a tile, such as by aligning B-splines across tile boundaries. The B-splines between the tiles are aligned in a similar manner to that described above. In this alignment, the curve fit for the first B-spline is within one tile, the curve fit for the second B-spline is within an adjacent tile, and the patch B-spline fits across the tile boundary. The B-spline alignment across tiles creates a seamless C2 B-spline joint at the tile boundary.

As shown in block 714, the apparatus of an example embodiment also includes means, such as the processor 102 or the like, for aligning multi-link spline intersection link spline geometry. In this regard, the apparatus, such as the processor, is configured to align B-spline ends at intersections where three or more roads meet. For each intersection, the apparatus, such as the processor, is configured to locate intersecting link chain B-splines, including self-intersections. Techniques for identifying the intersection of two B-splines, including self-intersecting B-splines, are well known. For each of the intersecting B-splines, the apparatus, such as the processor, of this example embodiment is configured to classify the intersection as a crossing B-spline, that is, four segments meeting at a single node, a T-junction, or a multi-intersection, that is, more than four segments meet at a single node. The apparatus, such as the processor, of this example embodiment is also configured to join the B-splines representing these roads at a common node.

For multi-link intersections where more than four segments meet at a single node, the apparatus, such as the processor 102, of an example embodiment is configured to adjust the 2D spline geometry so the segments meet at a common node. Due to the local support of B-splines and the fact that they are invariant to affine transformation makes the B-splines well suited for shape and position adjustments. Techniques for adjusting B-spline geometry curves are well known and may include, for example, least energy beam deflection theory so as to ensure a smooth shape with consistent and minimal adjustment to meet at the common location. For each multi-link intersection, the apparatus, such as the processor, of an example embodiment determines the common 2D location of the intersection node. The optimal location depends on intersection geometry shape, complexity, and the surrounding link connectivity. The B-splines are then shifted or their 2D shape adjusted in the vicinity of the intersection to align the splines without impacting the quality of their local curvature or heading. After the adjustment, the apparatus, such as the processor, of this example embodiment is configured to split the B-splines at the common intersection location.

The apparatus of an example embodiment also includes means, such as the processor 102 or the like, for determining node split locations, thereby identifying an optimal split location for overlapping link splines. See block 716. If the node is not at an intersection, the apparatus, such as the processor 102, of an example embodiment is configured to project the node onto the link chain B-spline to identify the split location. If the node is an intersection node, the apparatus, such as the processor, of an example embodiment is configured to determine the optimal split location based on the intersection classification as described above. In this regard, the apparatus, such as the processor, of an example embodiment is configured to determine the parametric intersection location of the link splines including any spline self-intersections.

As shown in block 718, the apparatus of an example embodiment also includes means, such as the processor 102 or the like, for splitting the link spline at the node(s), such as the nodes at which the link splines intersect so as to yield seamless spline geometry at those nodes with no spline gaps. In this regard, the apparatus, such as the processor, of an example embodiment is configured to split the link chain splines at the nodes using the split locations that were determined as described above to form individual B-splines, one for each segment. For crossing B-splines, the apparatus, such as the processor, of an example embodiment is configured to split the splines at the location where they intersect to create a common end point where the roads meet, such as determined above in conjunction with block 714. For T-junctions, due to the nature of the approximating B-spline curve fitting technique, the two link chain B-splines may or may not intersect at the T-junction. For intersecting T-junction link chain B-splines, the apparatus, such as the processor, of an example embodiment is configured to truncate and discard any overlapping sections. For non-intersecting T-junctions, the apparatus, such as the processor, of an example embodiment is configured to create an intersection location by extending or snapping, that is, bending or shifting, the terminating B-spline for the attaching side road segment to the main road link chain B-spline. The main road B-spline is split at the location where the terminating B-spline joins the main road B-spline after being extended or snapped. Techniques for extending and adjusting the shape or position of B-splines are well known.

The apparatus of an example embodiment also includes means, such as the processor 102 or the like, for splitting a link spline at a bivalent node. Since a bivalent node is not an intersection, the apparatus, such as the processor, of an example embodiment is configured to project the location of the bivalent node onto the link spline to identify the parametric split location.

After having converted a link geometry representative of a portion of a road network into a plurality of link splines, the apparatus also includes means, such as the processor 102 or the like, for converting the plurality of link splines into respective sequences of one or more clothoids based upon curvature profiles of the link splines. See block 502 of FIG. 5. In this regard, clothoids are utilized as transition curves in road design and are also known as the Cornu spiral or Euler's spiral. Clothoids are two-dimensional parametric curves with a property that their curvature $\kappa(t)$ is a linear function of the arc length s of the curve. Points on the clothoid are obtained by evaluating the following Fresnel integrals:

$$x=C(t), \quad y=S(t) \text{ where } S(t)=\alpha\int_0^t \sin(u^2)du, \quad C(t)=\alpha\int_0^t \cos(u^2)du \text{ and the arc length } s(t)=\alpha t$$

An alternate representation of clothoids may be obtained by transforming the unit clothoid by applying a rotation, translation and scale factor.

As shown in more detail in FIG. 8, the apparatus of an example embodiment converts the plurality of link splines into respective sequences of one or more clothoids by including means, such as the processor 102 or the like, for determining a plurality of break-point locations along a respective link spine that represents a portion of a road network. In order to determine the break-point locations along the respective link spline, the apparatus, such as the processor, determines the plurality of break-point locations dependent upon a curvature profile of the link spline so as to define one or more sections of the link spline based upon the break-point locations.

The break-point locations along the link spline define respective sections of the link spline with each section of the link spline extending between a pair of neighboring break-point locations. In an example embodiment, the break-point locations are described by the B-spline (u) parameter and the arc length along the curve, such as the length from the beginning of the link spline to the respective break-point location. Once the break-point locations have been determined, each section of the link spline is converted to one or more clothoids, such as a sequence of clothoids.

The break-point locations are determined based upon the linear curvature properties of the clothoids. Since the curvature of a clothoid varies linearly, including instances in which the curvature is constant and there is no change, the break-point locations may be identified based upon linear sections in the curvature profile of the link spline. As described below, the curvature profile of the link spline may therefore be approximated by a polyline with each vertex and zero-crossing of the polyline becoming a break-point, thereby yielding a sequence of break-point parameters $u_0, u_1, \ldots u_n$ in the range $u=[0, u_{max}]$ that determine a start and end-point of each clothoid along the spline curve. The start and end of the spline curve, that is, $u=0$ and $u=u_{max}$, are implicit break-points. The clothoid parameters that, in turn, define the sequence of clothoids are determined from the link spline at each break-point location including the implicit break-point locations at the beginning and the end of the link spline. As such, the apparatus, such as the processor 102, is configured to determine the plurality of break-point locations in a manner that is dependent upon the curvature profile of the link spline, thereby defining one or more sections of the link spline based upon the break-point locations.

As noted above, the apparatus, such as the processor 102, then converts the sections of the link spline to respective clothoids, such as by determining clothoid parameters at the break-point locations based upon corresponding parameters of the link spline. For example, the clothoid parameters that are determined from the break-point locations along the link spline include the clothoid arc length L of a respective clothoid, the end-point coordinates of a respective clothoid including start-point coordinates $P_S$ and the end-point coordinates $P_E$ and either the end tangent headings of the respective clothoid, such as the tangent heading $\theta_S$ at the start-point of the respective clothoid and the tangent heading at the end-point of the $\theta_E$ at the end-point of the respective clothoid or the end curvatures of the respective clothoid including the end curvature $\kappa_S$ at the start-point of the respective clothoid and the end curvature $\kappa_E$ at the end-point of the respective clothoid.

In other words in an instance in which the clothoid is determined based upon the end-point coordinates and end tangent headings, the apparatus, such as the processor 102, is configured to convert one or more sections of a link spline to a respective clothoids and includes means, such as the processor or the like, for determining coordinates of the link spline at the start break-point and the end break-point, means, such as the processor or the like, for determining tangent headings of the link spline at the start break-point and the end break-point and means, such as the processor or the like, for determining the respective clothoid based upon the coordinates and the tangent headings of the link spline at the start break-point and the end break-point. See blocks 802, 804 and 806 of FIG. 8. Alternatively, in an instance in which the apparatus, such as the processor, is configured to convert one or more sections of a link spline to respective clothoids utilizing end-point coordinates and end curvatures, the apparatus includes means, such as the processor or the like, for converting one or more sections of the link spline to respective clothoids that includes means, such as the processor or the like, for determining coordinates of the link spline at the start break-point and the end break-point, means, such as the processor or the like, for determining curvatures of the link spline at the start break-point and the end break-point and means, such as the processor or the like, for determining the respective clothoid based upon the coordinates and the curvatures of the link spline at the start break-point and the end break-point. In either instance, the apparatus, such as the processor, is configured to repeat the foregoing process for each section of the link spline as shown in block 808.

By way of example, a portion of a link spline is presented in FIG. 9. Three break-point locations have been determined along the portion of the link spline, thereby defining two clothoids with clothoid$_1$ extending from a first start-point 1S to a first end-point 1E and a second clothoid extending from a second start-point 2S, coincident with the first end-point 1E, to a second end-point 2E. The apparatus, such as the processor 102, of an example embodiment is configured to convert each section of the link spline to a respective clothoid utilizing either the end-point coordinates $P_S$, $P_E$ and the end tangent headings $\theta_S$, $\theta_E$ or the end-point coordinates $P_S$, $P_E$ and the end curvatures $\kappa_S$, $\kappa_E$. In an instance in which the end tangent headings are utilized, a sequence of clothoids that have matching headings at the junctions, such as the break-point locations, is generated, albeit with a potential slight curvature discontinuity at the junctions. However, reliance upon the end curvatures will generate a sequence of clothoids with matching curvatures at the junctions, such as the break-point locations, but with potential slight heading discontinuities at the junctions.

In order to convert the sections of the link spline to respective clothoids, the apparatus, such as the processor 102, determines the link spline properties at the break-point locations. Break-point locations that are closer together will generally permit clothoids to be generated that more closely match the underlying link spline relative to break-point locations that are further spaced from one another. For a section of a link spline that extends from a break-point location $u_A$ to a break-point location $u_B$, the respective clothoid may be determined as follows: Clothoid=$f(P_A, P_B, \theta_A, \theta_B)$ for a clothoid based upon end-point coordinates and end tangent headings or Clothoid=$f(P_A, P_B, \kappa_A, \kappa_B)$ for a clothoid based upon end-point coordinates and end curvatures. In either instance, in an embodiment in which the link spline is represented by a non-uniform cubic B-spline, the corresponding B-spline properties may be determined by the processor as follows: $P_A$=Spline point $(u_A)$, $P_B$=Spline point $(u_B)$, $\theta_A$=Spline heading $(u_A)$, $\theta_B$=Spline heading $(u_B)$. Thus, one or more sections of a link spline may be efficiently and reliably converted to respective clothoids, such as for utilization in conjunction with map displays and to support ADAS capabilities.

Referring now to FIGS. 10a and 10b, a more detailed flowchart of the operations performed in order to convert a link spline to a sequence of clothoids is depicted. As described above, the link spline is representative of a portion of a road network. In this regard, FIG. 8 depicts a portion of a road network as represented by a B-spline curve 800 that extends from the beginning 802 of the link to the end 804 of the link. As shown in block 1000 of FIG. 10a, the apparatus includes means, such as the processor 102 or the like, for determining a curvature profile defining a curvature of the link spline at a respective arc length. In this regard, a curvature profile is a sequence of curvature values along the curve with corresponding arc length values, as measured from the beginning 802 of the link, for example. The curvature profile is therefore an ordered array of [curvature, arc length] value pairs. For example, a curvature profile may be represented as follows: $[(\kappa, s)_1, (\kappa, s)_2 \ldots (\kappa, s)_D]$. FIG. 11 depicts an example of the curvature profile along a portion of the link spline representative of the road network of FIG. 6 with the curvatures being sampled with equal spacing, such as every one meter, along the link spline. In the curvature profile of FIG. 9, the vertical axis denotes the curvature magnitude [1/m] with units in 1/radius as measured in 1/meters and the horizontal x-axis represents the arc length, such as the road length in meters, from the beginning of the link spline to the end of the link spline.

As shown in block 1002 of FIG. 10a, the apparatus of this example embodiment also includes means, such as the processor 102 or the like, for identifying one or more zero-crossings in the curvature profile so as to define curves therebetween. In this regard, each curve is defined between a pair of neighboring zero-crossings as identified from the curvature profile. The zero-crossings are identified so as to permit the curvature profile to be more accurately linearized, such as with polylines. As such, the zero-crossings permit each curve in the road to be separately identified and then to be separately processed as desired as a result of the logarithmic scale of curvature. In this regard, since curvature varies from zero for straight sections to positive or negative infinity, a curvature segmentation threshold is established for each curve as described below.

In an example embodiment, the zero-crossings of the curvature profile are identified in an instance in which the sign of the curvature changes in the curvature profile at location i, such as by changing from one point $(\kappa, s)_i$ along the curvature profile to the next point $(\kappa, s)_{i+1}$. The apparatus, such as the processor 102, of an example embodiment then identifies the zero-crossing $u_{zero\_crossing}$ as the linear intersection between $(\kappa, s, u)_i$, $(\kappa, s, u)_{i+1}$ and $\kappa=0$ as follows:

$$u_{zero\_crossing} = u_i + t(u_{i+1} - u_i) \text{ where}$$

$$t = \frac{\kappa_i}{(\kappa_i - \kappa_{i+1})}$$

The apparatus, such as the processor, of this example embodiment is also configured to determine the arc length for the zero-crossings, such as from the beginning 802 of the link spline 800 as follows:

$$s_{zero\_crossing} = s_i + t(s_{i+1} - s_i)$$

In this regard, FIG. 12 depicts a portion of the curvature profile 1200 of FIG. 11 with the zero-crossings 1202, that is, the points at which the curvature profile crosses the x-axis being circled. FIG. 12 also depicts the corresponding portion of the spline curve 1204 with linear extensions 1206 extending perpendicular from the spline curve at each of a plurality of locations. The length of each extension is representative of the curvature at the respective location and the direction in which each extension extends indicates whether the curvature is positive or negative. In this regard, the linear extensions extending to one side of the spline curve are representative of the locations along the link spline that have a positive curvature and the linear extensions to the opposite side of the link spline are representative of locations having a negative curvature. The zero-crossing locations are also identified along the link spline. Between each pair of neighboring zero-crossings, a different curve section is defined.

The apparatus of an example embodiment also includes means, such as the processor 102 or the like, for determining, for each curve section identified between respective zero-crossings 1002 of the curvature profile 1000, whether the curve section is straight. See block 1004. In an instance in which a curve section is determined to be straight, the respective curve need not be further approximated with polylines, as will be described below for curves that are not straight sections. Instead, the apparatus, such as the processor, is configured to create a straight curvature line for the straight curve section, as shown in block 1006. In an example embodiment, the apparatus, such as the processor, is configured to determine if a curve section is a straight section based upon the subtended angular arc of the curve section. In this regard, the apparatus, such as the processor, is configured to determine whether a subtended angular arc (based on the average curvature of the curve section) is within a predefined threshold of a chord of the curve section. While the predefined threshold may have various values, the predefined threshold of one example embodiment is 0.15 meters. The apparatus, such as the processor, of this example embodiment is configured to identify the curve to be straight in an instance in which the subtended angular arc of the curve is within the predefined threshold of the chord of the curve. In an instance in which the curve section is identified to be straight, the apparatus, such as the processor, is configured to create a straight curvature profile line, such as a straight polyline, extending from the zero-crossings at the beginning and end of the curve section prior to proceeding with the analysis of the next curve section.

In an instance in which a curve section is not identified to be straight, the apparatus of an example embodiment may include means, such as the processor 102 or the like, for determining if the respective curve section includes one or more kinks, such as a sharp corner with only C0 discontinuity, and, if so, to split the curve at the kink location into curve sections, thereby ensuring that one clothoid will end at the location of the kink and a next clothoid will begin at the location of the kink. See blocks 1008 and 1010 of FIG. 10a. Kinks may be determined in various manners, but the location of a kink along a curve section may be identified in an instance in which the curve section is a cubic non-uniform B-spline by a knot multiplicity of three at the respective location. In an instance in which a kink is identified, the curve section is split into two or more curve sections at the kink location. By splitting the curve into curve sections at the kink and ensuring that each curve section will be converted to one or more respective clothoids such that one clothoid ends at the location of the kink and another clothoid begins at the location of the kink, the resulting clothoids will more accurately represent the analytical curve at the location of the kink.

As shown in blocks 1012 and 1014 of FIG. 10a, the apparatus of an example embodiment also includes means, such as the processor 102 or the like, for determining if a curve section is multi-modal and, if so, splitting the multi-modal curve into individual curve sections. Multi-modal curve sections represent curves in a road that have two or more curvature peaks. In order to more accurately represent the multi-modal curve section with clothoids, each curve of the multi-modal curve section is treated as an individual curve section with a separate maximum curvature value.

The apparatus of this example embodiment therefore includes means, such as the processor 102 or the like, for identifying a curve to be multi-modal. See block 1012 of FIG. 10a. The apparatus, such as the processor, may identify a curve to be multi-modal in various manners including by statistical methods, such as clustering techniques, or analytically. For example, the apparatus, such as the processor, of an embodiment identifies a curve to be multi-modal based on an analysis of the intersection of the curvature profile lines and, more particularly, by determining if the extension of any curvature profile line intersects the x-axis between its zero-crossings 1202. In an instance in which a curvature profile line intersects the x-axis of the curvature profile between its zero-crossings, a multi-modal curve is identified. The apparatus of this example embodiment also includes means, such as the processor or the like, for splitting the multi-modal curve into two or more curve sections. See block 1014 of FIG. 10a. For example, in an instance in which a curve section is identified to be multi-modal as a result of a curvature profile line intersecting the horizontal x-axis of the curvature profile between the zero-crossings, the apparatus, such as the processor, is configured to split the curve section at that point, that is, the point having an arc length s value where a curvature profile line intersects the x-axis. In another example, the curvature profile is split at the arc length location corresponding to the midpoint between the curvature peaks. Other ways of splitting the curve section to separate curvature peaks are also possible. The apparatus, such as the processor, may be configured to repeat this process recursively until a multi-modal curve has been split into curve sections such that none of the resulting curve sections are multi-modal.

As shown in block 1016 of FIG. 10a, the apparatus of an example embodiment also includes means, such as the processor 102 or the like, for determining a line approximation threshold based on the maximum curvature. In this regard, for each curve section, the apparatus, such as the processor, is configured to determine the line approximation threshold based on the maximum curvature $\kappa_{MAX}$ of the respective curve section. The line approximation threshold is determined based on the maximum curvature $\kappa_{MAX}$ of each respective curve section since a fixed or predefined line fit threshold is generally not able to be utilized for the entire analytical curve, such as an entire spline due, to the logarithmic nature of curvature. In an example embodiment, the apparatus, such as the processor, is configured to define the line approximation threshold T to be proportional to the maximum curvature $\kappa_{MAX}$ of each curve section, such as follows: $T=\xi\kappa_{MAX}$. In this example embodiment, the threshold scaling parameter $\xi$ may vary depending on road attributes, such as functional class. Alternatively, a fixed or predefined threshold scaling parameter $\xi$ may be utilized.

For those curve sections that have not been identified to be straight, the apparatus of an example embodiment also includes means, such as the processor 102 or the like, for approximating the curvature profile of a curve section with a polyline and, consequently, for approximating the curvature profile of the curve with a plurality of polylines. See block 1018 of FIG. 10a. A curvature profile may be approximated with polylines in various manners. However, the apparatus, such as the processor, of an example embodiment utilizes a recursive Douglas-Peuker line simplification technique, using a maximum error split location, to approximate the curvature profile. The Douglas-Peuker line simplification technique approximates the curvature profile for a curve section recursively until all polyline segments are within a specified tolerance T, such as described above.

In this regard, FIG. 13 depicts the curvature profile 1200 for a portion of a curve and the polylines 1300 created by the Douglas-Peuker line simplification technique. As shown, polyline vertices V are identified at the intersection of adjacent polylines and the vertices, along with the zero-crossings 1202, comprise the break-point locations that serve as the start-point and the end-point of each respective clothoid curve. Thus, the apparatus of an example embodiment includes means, such as the processor 102 or the like, for determining the break-point locations based upon vertices and zero-crossings of the plurality of polylines with which the curvature profile of the curve has been approximated.

As shown in blocks 1020 and 1022 of FIG. 10a, the foregoing process of determining the break-point locations of a curvature profile and then approximating the curvature with polylines is repeated for each curve section. With reference to blocks 1024 and 1026 of FIG. 10b, the apparatus of an example embodiment includes means, such as the processor 120 or the like, for determining if adjacent polylines should be merged and, if so, then merging some of the adjacent polylines so as to filter out intervening break-points and permitting the adjacent curve sections that have been merged to be effectively represented by a single clothoid. By way of example, the apparatus, such as the processor, of an example embodiment is configured to eliminate break-points and therefore merge adjacent curve sections in an instance in which the curvature of a polyline across a zero-crossing 1202 changes linearly, thereby permitting the zero-crossing vertex to be eliminated. With reference to FIG. 13, for example, zero-crossing 1202' may be eliminated as the curvature of the polyline passing therethrough changes linearly or approximately linearly, such as within a predefined linearity threshold, if at all. As another example, the apparatus, such as the processor, may be configured to eliminate break-points for two or more adjacent straight sections the vertex between the adjacent straight sections being eliminated as a result of the merger of the adjacent straight sections. By merging adjacent curve sections, unnecessary clothoids may be eliminated such that the resulting conversion process is more efficient.

While various criteria may be defined with respect to the merging of polylines and the filtration of break-points, break-points are filtered in an example embodiment in an instance in which the resulting clothoids are short, such as by having a length less than three meters, the resulting clothoids are practically straight, such as clothoids having a radius greater than 10,000 meters, and the clothoids have similar α parameter values, such as defined by $s(t)=\alpha t$ as defined above.

Following the merging of adjacent polylines and the filtration of break-points, each remaining vertex and zero-crossing 1202 is representative of a break-point location that defines the sections of the analytical curve that, in turn, are converted to respective clothoids. In this regard, each pair of adjacent vertices, such as a vertex V or a zero-crossing vertex, at opposite ends of a respective polyline define the break-point locations that serve as the start and end locations of a clothoid. The vertices are shared between each successive clothoid such that the end break-point location of one clothoid is the start break-point location of the successive clothoid.

As described above, each vertex of the curvature profile line approximation is associated with an arc length location along the underlying curve, such as measured from the start at the analytical curve. As described above, the apparatus also includes means, such as the processor 102 or the like, for converting each section of the analytical curve to a respective clothoid. See block 1028 of FIG. 10b. In this regard and as described above, each curve section may be converted based upon the coordinates of the analytical curve at the start break-point and the end break-point as well as one of the tangent headings of the analytical curve at the start break-point and the end break-point or the curvatures of the analytical curve at the start break-point and the end break-point. See blocks 802, 804 and 806 of FIG. 8.

In some embodiments, the apparatus, such as the processor 102, is also configured to compare the shape and positional closeness between the resulting clothoid and the underlying analytical curve in order to determine if the respective clothoid sufficiently represents the curve section of the underlying analytical curve. In an example embodiment, the apparatus, such as the processor, is configured to determine curve properties of the clothoid and the corresponding curve section of the underlying analytical curve. For example, the apparatus, such as the processor, may be configured to sample points on the clothoid, such as points spaced apart at a predefined interval, e.g., one meter, and to project the same points onto the curve section, such as the B-spline of the underlying analytical curve. The apparatus, such as the processor, of this example embodiment is configured to compare the curve properties, such as curvature, heading, distance, etc. at each point. If the curve properties of the clothoid deviate from the corresponding properties of the curve section of the underlying analytical curve by more than a predefined tolerance, the respective curve section is split into two or more curve subsections, such as by splitting the respective curve section in two by the insertion of an additional break-point location at the midpoint location of the respective curve section or at the location at which the maximum error between the curve properties occurs. See blocks 1030 and 1032 of FIG. 10b. Once the curve section has been split into curve subsections, the apparatus, such as the processor, is configured to convert each curve subsection into a clothoid that more accurately represents the respective curve subsections. See block 1034 of FIG. 10b. The apparatus, such as the processor, may be configured to repeat this process recursively until the curve properties of each clothoid are within the predefined tolerance of the respective curve section or subsection. As shown in block 1036 of FIG. 10b, the apparatus, such as the processor, the memory 105 or the like, is configured to store each clothoid, such as each clothoid that is determined to be within the predefined tolerance of the respective curve section.

Referring now to FIG. 14, a sequence of clothoids 1400 representative of the link geometry that represents a portion of the road network depicted in FIG. 6. Extensions 1402 extending perpendicularly outward from the sequence of clothoids represent the curvature of a clothoid at a respective arc length. As will be noted, the curvature of the clothoids linearly increases and decreases so as to correspondingly represent the portion of the road network.

As described above, the link splines representative of a portion of a road network may be efficiently and accurately converted into respective clothoids, such as for use by a map display or for supporting ADAS capabilities. By utilizing clothoids, the performance of the map display or the ADAS capabilities may be improved, such as in terms of the efficiency of operation.

As described above, a two dimensional road geometry may be represented by a sequence of clothoids. In an example embodiment, however, the method and apparatus is additionally configured to provide a representation of a three dimensional road segment. In this example embodiment, a first sequence of clothoids could be constructed as described above to represent the two dimensional map geometry, while a second sequence of clothoids could be constructed to represent the altitude dimension associated with the road segment, that is, to represent the height of the road segment as a function of arc-length along the two dimensional representation of the road geometry.

FIGS. 5, 7, 8, 10a and 10b illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 105 of an apparatus employing an embodiment of the present invention and executed by a processor 102 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although the apparatus is described to embody the MPE 116, the apparatus may be distinct and independent from the MPE and, in one embodiment, may provide the clothoid road geometry in the form of a sequence of clothoids to the MPE for use in conjunction with a map display or to support ADAS capabilities. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    converting a link geometry representative of a portion of a road network into a plurality of link splines comprising piecewise polynomial functions, wherein the link geometry comprises a plurality of links and is stored by a database, and wherein converting the link geometry into the plurality of link splines comprises defining a plurality of partially overlapping link chains with each link chain comprised of a plurality of links, converting each link chain into a respective link spline and aligning respective ends of the link splines corresponding to overlapping link chains;
    converting the plurality of link splines into respective sequences of one or more clothoids based upon curvature profiles of the link splines, wherein converting the plurality of link splines into respective sequences of one or more clothoids comprises, for each link spline, determining a plurality of break-point locations along a respective link spline dependent upon a curvature profile of the link spline comprising an ordered array of [curvature κ, arc length s] value pairs by identifying one or more zero-crossings to define one or more respective break-point locations, approximating a section between neighboring zero-sections with a polyline, and converting one or more sections of the respective link spline to respective clothoids; and
    using the respective sequences of one or more clothoids by a map display or to support an advanced driver assistance system (ADAS).

2. The method according to claim 1, wherein converting one or more sections of the respective link spline to respective clothoids comprises:
    for a section of the respective link spline having a start break-point and an end break-point, determining coordinates of the link spline at the start break-point and the end break-point;
    determining tangent headings of the of the link spline at the start break-point and the end break-point; and
    determining the respective clothoid based upon the coordinates and the tangent headings of the link spline at the start break-point and the end break-point.

3. The method according to claim 1, wherein converting one or more sections of the respective link spline to respective clothoids comprises:
    for a section of the respective link spline having a start break-point and an end break-point, determining coordinates of the link spline at the start break-point and the end break-point;
    determining curvatures of the of the link spline at the start break-point and the end break-point; and
    determining the respective clothoid based upon the coordinates and the curvatures of the link spline at the start break-point and the end break-point.

4. The method according to claim 1, further comprising:
    determining the curvature profile defining a curvature of the respective link spline at a respective arc length; and
    wherein approximating a section between neighboring zero-sections comprises approximating the curvature profile of a curve comprised of a plurality of curve sections with a plurality of polylines with each polyline approximating the curvature profile of a respective curve section, wherein determining the plurality of break-point locations comprises determining the break-point locations based upon vertices identified at intersections of adjacent polylines and zero-crossings of the plurality of polylines.

5. The method according to claim 1, wherein each link chain is representative of one or more road segments having a same road type attribute.

6. The method according to claim 1, further comprising:
    subdividing the link geometry comprising a plurality of links into a plurality of tiles; and
    aligning respective ends of the link splines that meet at a boundary of a tile.

7. An apparatus embodied by a map and positioning engine (MPE) or an advanced driver assistance system (ADAS), the apparatus comprising at least one processor and at least one memory including computer program code, the at least one memory and computer program code configured to, with the processor, cause the apparatus to at least:
    convert a link geometry representative of a portion of a road network into a plurality of link splines comprising piecewise polynomial functions, wherein the link geometry comprises a plurality of links and is stored by a database, and wherein the apparatus is caused to convert the link geometry into the plurality of link splines by defining a plurality of partially overlapping link chains with each link chain comprised of a plurality of links, converting each link chain into a respective link spline and aligning respective ends of the link splines corresponding to overlapping link chains; and convert the plurality of link splines into respective sequences of one or more clothoids based upon curvature profiles of the link splines, wherein the apparatus is caused to convert the plurality of link splines into respective sequences of one or more clothoids by, for each link spline, determining a plurality of break-point locations along a respective link spline dependent upon a curvature profile of the link spline comprising an ordered array of [curvature κ, arc length s] value pairs by identifying one or more zero-crossings to define one or more respective break-point locations, approximating a section between neighboring zero-sections with a polyline, and converting one or more sections of the respective link spline to respective clothoids.

8. The apparatus according to claim 7, wherein the at least one memory and computer program code are configured to, with the processor, cause the apparatus to convert one or more sections of the respective link spline to respective clothoids by:

for a section of the respective link spline having a start break-point and an end break-point, determining coordinates of the link spline at the start break-point and the end break-point;

determining tangent headings of the of the link spline at the start break-point and the end break-point; and determining the respective clothoid based upon the coordinates and the tangent headings of the link spline at the start break-point and the end break-point.

9. The apparatus according to claim 7, wherein the at least one memory and computer program code are configured to, with the processor, cause the apparatus to convert one or more sections of the respective link spline to respective clothoids by:

for a section of the respective link spline having a start break-point and an end break-point, determining coordinates of the link spline at the start break-point and the end break-point;

determining curvatures of the of the link spline at the start break-point and the end break-point; and determining the respective clothoid based upon the coordinates and the curvatures of the link spline at the start break-point and the end break-point.

10. The apparatus according to claim 7, wherein the at least one memory and computer program code are further configured to, with the processor, cause the apparatus to:

determine the curvature profile defining a curvature of the respective link spline at a respective arc length; and wherein the apparatus is caused to approximate a section between neighboring zero-sections by approximating the curvature profile of a curve comprised of a plurality of curve sections with a plurality of polylines with each polyline approximating the curvature profile of a respective curve section, wherein the at least one memory and computer program code are configured to, with the processor, cause the apparatus to determine the plurality of break-point locations by determining the break-point locations based upon vertices identified at intersections of adjacent polylines and zero-crossings of the plurality of polylines.

11. The apparatus according to claim 7, wherein each link chain is representative of one or more road segments having a same road type attribute.

12. The apparatus according to claim 7, wherein the at least one memory and computer program code are further configured to, with the processor, cause the apparatus to:

subdivide the link geometry comprising a plurality of links into a plurality of tiles; and align respective ends of the link splines that meet at a boundary of a tile.

13. A computer program product embodied by a map and positioning engine (MPE) or an advanced driver assistance system (ADAS), the computer program product comprising at least one non-transitory computer-readable storage medium having computer-executable program code portions stored therein, the computer-executable program code portions comprising program code instructions configured to:

convert a link geometry representative of a portion of a road network into a plurality of link splines comprising piecewise polynomial functions, wherein the link geometry comprises a plurality of links and is stored by a database, and wherein the link geometry is converted into the plurality of link splines by defining a plurality of partially overlapping link chains with each link chain comprised of a plurality of links, converting each link chain into a respective link spline and aligning respective ends of the link splines corresponding to overlapping link chains; and convert the plurality of link splines into respective sequences of one or more clothoids based upon curvature profiles of the link splines, wherein the plurality of link splines are converted into respective sequences of one or more clothoids by, for each link spline, determining a plurality of break-point locations along a respective link spline dependent upon a curvature profile of the link spline comprising an ordered array of [curvature κ, arc length s] value pairs by identifying one or more zero-crossings to define one or more respective break-point locations, approximating a section between neighboring zero-sections with a polyline, and converting one or more sections of the respective link spline to respective clothoids.

14. The computer program product according to claim 13, wherein the program code instructions configured to convert one or more sections of the respective link spline to respective clothoids comprise program code instructions configured to:

for a section of the respective link spline having a start break-point and an end break-point, determine coordinates of the link spline at the start break-point and the end break-point;

determine tangent headings of the of the link spline at the start break-point and the end break-point; and determine the respective clothoid based upon the coordinates and the tangent headings of the link spline at the start break-point and the end break-point.

15. The computer program product according to claim 13, wherein the program code instructions configured to convert one or more sections of the respective link spline to respective clothoids comprise program code instructions configured to:

for a section of the respective link spline having a start break-point and an end break-point, determine coordinates of the link spline at the start break-point and the end break-point;

determine curvatures of the of the link spline at the start break-point and the end break-point; and determine the respective clothoid based upon the coordinates and the curvatures of the link spline at the start break-point and the end break-point.

16. The computer program product according to claim 13, wherein the computer-executable program code portions further comprise program code instructions configured to:

determine the curvature profile defining a curvature of the respective link spline at a respective arc length; and wherein the program code instructions configured to approximate a section between neighboring zero-sections comprise program code instructions configured to approximate the curvature profile of a curve comprised of a plurality of curve sections with a plurality of polylines with each polyline approximating the curvature profile of a respective curve section, wherein the program code instructions configured to determine the plurality of break-point locations comprise program code instructions configured to determine the break-point locations based upon vertices identified at intersections of adjacent polylines and zero-crossings of the plurality of polylines.

17. The computer program product according to claim 13, wherein each link chain is representative of one or more road segments having a same road type attribute.

* * * * *